United States Patent
Zhang

(10) Patent No.: US 12,324,016 B2
(45) Date of Patent: Jun. 3, 2025

(54) METHOD AND APPARATUS RELATED TO DIRECTION-BASED LISTEN BEFORE TALK

(71) Applicant: ZTE CORPORATION, Guangdong (CN)

(72) Inventor: Li Zhang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 369 days.

(21) Appl. No.: 17/868,864

(22) Filed: Jul. 20, 2022

(65) Prior Publication Data
US 2022/0353914 A1 Nov. 3, 2022

Related U.S. Application Data

(63) Continuation of application No. PCT/CN2020/111619, filed on Aug. 27, 2020.

(51) Int. Cl.
| | |
|---|---|
| *H04W 74/0808* | (2024.01) |
| *H04B 17/318* | (2015.01) |
| *H04W 24/08* | (2009.01) |
| *H04W 24/10* | (2009.01) |
| *H04W 74/0833* | (2024.01) |
| *H04W 76/19* | (2018.01) |

(52) U.S. Cl.
CPC ...... *H04W 74/0808* (2013.01); *H04B 17/318* (2015.01); *H04W 24/08* (2013.01); *H04W 24/10* (2013.01); *H04W 74/0833* (2013.01); *H04W 76/19* (2018.02)

(58) Field of Classification Search
CPC ......... H04W 74/0833; H04W 74/0808; H04W 24/10; H04W 24/08; H04W 76/19; H04B 17/318
USPC ......................................... 370/225
See application file for complete search history.

(56) References Cited

U.S. PATENT DOCUMENTS

| | | | |
|---|---|---|---|
| 2020/0015236 A1 | 1/2020 | Kung et al. | |
| 2020/0052803 A1* | 2/2020 | Deenoo | H04W 48/12 |
| 2020/0252846 A1* | 8/2020 | Ozturk | H04W 36/38 |
| 2023/0058492 A1* | 2/2023 | Wang | H04L 5/001 |

FOREIGN PATENT DOCUMENTS

| | | |
|---|---|---|
| CN | 110278599 A | 9/2019 |
| CN | 111107555 A | 5/2020 |
| WO | WO-2019/210185 A1 | 10/2019 |
| WO | WO-2019/245779 A1 | 12/2019 |

OTHER PUBLICATIONS

International Search Report and Written Opinion for PCT Appl. No. PCT/CN2020/111619, mailed Jun. 2, 2021 (9 pages).

(Continued)

*Primary Examiner* — Peter G Solinsky
(74) *Attorney, Agent, or Firm* — Foley & Lardner LLP

(57) ABSTRACT

Presented are systems and methods for direction-based listen before talk (LBT). A wireless communication device may perform one or more listen-before-talk (LBT) attempts on each of a plurality of beams. Each of the plurality of beams may have a respective beam direction. The wireless communication device may determine a count of failed LBT attempts for at least one of the plurality of beams.

20 Claims, 7 Drawing Sheets

(56) References Cited

OTHER PUBLICATIONS

Zte et al.: "Discussion on the channel access mechanism for above 52.6GHz" 3GPP TSG RAN WG1 #102-e; R1-2005608; Aug. 28, 2020; e-Meeting (7 pages).
Extended European Search Report for EP Appl. No. 20950699.7, dated Dec. 12, 2022 (11 pages).
LG Electronics, "Initial access and mobility for NR-U" 3GPP TSG RAN WG1 #97, R1-1906676, May 17, 2019, Reno, USA (23 pages).
ZTE Corporation et al., "UE declaring beam failure due to LBT failures during active TCI switching" 3GPP TSG-RAN2 Meeting 110-e, R2-2004616, Jun. 12, 2020, Online (3 pages).

\* cited by examiner

| C7 | C6 | C5 | C4 | C3 | C2 | C1 | C0 |
|---|---|---|---|---|---|---|---|
| R | R | beam index | | | | | |

| R | R | beam index |
|---|---|---|

Figure 6:
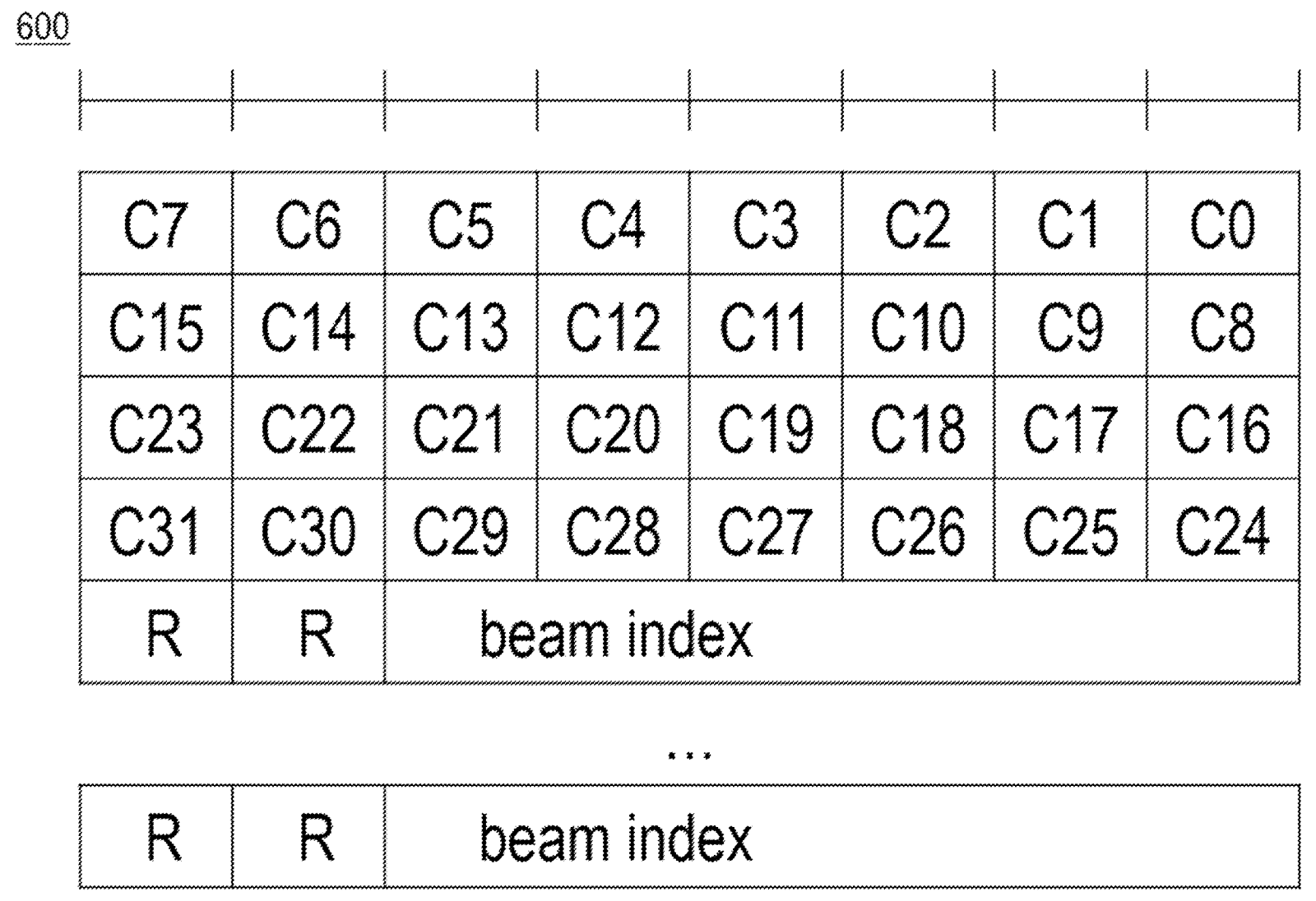

| C7 | C6 | C5 | C4 | C3 | C2 | C1 | C0 |
|----|----|----|----|----|----|----|----|
| C15 | C14 | C13 | C12 | C11 | C10 | C9 | C8 |
| C23 | C22 | C21 | C20 | C19 | C18 | C17 | C16 |
| C31 | C30 | C29 | C28 | C27 | C26 | C25 | C24 |
| R | R | \multicolumn{4}{c|}{beam index} | | | |

| R | R | beam index |
|---|---|---|

METHOD AND APPARATUS RELATED TO DIRECTION-BASED LISTEN BEFORE TALK

CROSS-REFERENCE TO RELATED APPLICATION

This application claims the benefit of priority under 35 U.S.C. § 120 as a continuation of PCT Patent Application No. PCT/CN2020/111619, filed on Aug. 27, 2020, the disclosure of which is incorporated herein by reference in its entirety.

TECHNICAL FIELD

The disclosure relates generally to wireless communications, including but not limited to systems and methods for direction-based listen before talk (LBT).

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). The 5G NR will have three main components: a 5G Access Network (5G-AN), a 5G Core Network (5GC), and a User Equipment (UE). In order to facilitate the enablement of different data services and requirements, the elements of the SGC, also called Network Functions, have been simplified with some of them being software based, and some being hardware based, so that they could be adapted according to need.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

At least one aspect is directed to a system, method, apparatus, or a computer-readable medium. A wireless communication device may perform one or more listen-before-talk (LBT) attempts on each of a plurality of beams. Each of the plurality of beams may have a respective beam direction. The wireless communication device may determine a count (e.g., a number or other statistics) of failed LBT attempts for at least one of the plurality of beams.

In some embodiments, the wireless communication device may identify a plurality of synchronization signal blocks (SSBs) or channel state information reference signals (CSI-RSs) meeting a first threshold. In some embodiments, the wireless communication device may identify a physical random access channel (PRACH) resource for each of the plurality of SSBs or CSI-RSs. In some embodiments, the wireless communication device may identify a preamble corresponding to the SSB or CSI-RS for each of the plurality of SSBs or CSI-RSs. In some embodiments, the wireless communication device may perform at least one LBT attempt for each of the identified PRACH resources. In some embodiments, the wireless communication device may identify one of the plurality of beams corresponding to one of a number of successful LBT attempts. In some embodiments, the wireless communication device may transmit a corresponding preamble.

In some embodiments, the wireless communication device may receive downlink control information (DCI) from a wireless communication node. In some embodiments, the DCI may comprise an indication of a plurality of synchronization signal blocks (SSBs). In some embodiments, the wireless communication device may perform the one or more LBT attempts on the plurality of beams responsive to the indication of the plurality of SSBs. In some embodiments, the plurality of beams may correspond to the plurality of SSBs.

In some embodiments, the wireless communication device may determine that each of at least one synchronization signal blocks (SSBs) or channel state information reference signals (CSI-RSs) has a reference signal received power (RSRP) that is above (e.g., at and/or above) a first threshold. In some embodiments, the wireless communication device may determine that each of at least one SSBs or CSI-RSs has a received signal strength indicator (RSSI) that is below (e.g., at and/or below) a second threshold. In some embodiments, the wireless communication device may select one or more of the at least one SSBs or CSI-RSs to perform the one or more LBT attempts. In some embodiments, the wireless communication device may identify one of the plurality of beams corresponding to a successful LBT attempt, to transmit a preamble.

In some embodiments, the wireless communication device may determine that each of at least one synchronization signal blocks (SSBs) or channel state information reference signals (CSI-RSs) has a reference signal received power (RSRP) that is above (e.g., at and/or above) a first threshold. In some embodiments, the wireless communication device may determine that none of the at least one SSBs or CSI-RSs have a received signal strength indicator (RSSI) that is below (e.g., at and/or below) a second threshold. In some embodiments, the wireless communication device may select one or more of the at least one SSBs or CSI-RSs to perform the one or more LBT attempts. In some embodiments the wireless communication device may select one or more of the at least one SSBs or CSI-RSs according to RSSI measurements of the at least one SSBs or CSI-RSs. In some embodiments, the wireless communication device may identify one of the plurality of beams corresponding to a successful LBT attempt (from the one or more LBT attempts), to transmit a preamble.

In some embodiments, the wireless communication device may determine that each of at least one synchronization signal blocks (SSBs) or channel state information reference signals (CSI-RSs) has a received signal strength indicator (RSSI) that is below a second threshold. In some embodiments, the wireless communication device may determine that none of the at least one SSBs or CSI-RSs have a reference signal received power (RSRP) that is above a first threshold. In some embodiments, the wireless communication device may select one or more of the at least one SSBs or CSI-RSs to perform the one or more LBT attempts. In some embodiments, the wireless communication device may identify one of the plurality of beams corresponding to a successful LBT attempt (from the one or more LBT attempts), to transmit a preamble.

In some embodiments, the wireless communication device may determine that none of at least one synchronization signal blocks (SSBs) or channel state information reference signals (CSI-RSs) have a reference signal received power (RSRP) that is above (e.g., at and/or above) a first threshold. In some embodiments, the wireless communication device may determine that none of at least one SSBs or CSI-RSs have a received signal strength indicator (RSSI) that is below (e.g., at and/or below) a second threshold. In some embodiments, the wireless communication device may select one or more of the at least one SSBs or CSI-RSs to perform the one or more LBT attempts. In some embodiments, the wireless communication device may identify one of the plurality of beams corresponding to a successful LBT attempt, to transmit a preamble.

In some embodiments, the wireless communication device may select one or more of the at least one SSBs or CSI-RSs to perform the one or more LBT attempts according to a pre-configured implementation of the wireless communication device. In some embodiments, the wireless communication device may select one or more of the at least one SSBs or CSI-RSs to perform the one or more LBT attempts according to the one or more of the at least one SSBs or CSI-RSs having RSRPs that are closest to the first threshold among those of the at least one SSBs or CSI-RSs. In some embodiments, the wireless communication device may select one or more of the at least one SSBs or CSI-RSs to perform the one or more LBT attempts according to the one or more of the at least one SSBs or CSI-RSs having RSSIs that are closest to the second threshold among those of the at least one SSBs or CSI-RSs.

In some embodiments, the wireless communication device may select one or more of the at least one SSBs or CSI-RSs to perform the one or more LBT attempts according to the one or more of the at least one SSBs or CSI-RSs having RSRPs that exceed (e.g., meet and/or are above) the first threshold by greatest extents among those of the at least one SSBs or CSI-RSs. In some embodiments, the wireless communication device may select one or more of the at least one SSBs or CSI-RSs to perform the one or more LBT attempts according to the one or more of the at least one SSBs or CSI-RSs having RSSIs that exceed the second threshold by greatest extents among those of the at least one SSBs or CSI-RSs. In some embodiments, the wireless communication device may select one or more of the at least one SSBs or CSI-RSs to perform the one or more LBT attempts according to a random selection process.

In some embodiments, the wireless communication device may determine that each of at least one synchronization signal blocks (SSBs) or channel state information reference signals (CSI-RSs) has a reference signal received power (RSRP) that is above a first threshold. In some embodiments, the wireless communication device may determine a count of failed LBT attempts for each of the at least one SSBs or CSI-RSs. In some embodiments, the wireless communication device may select one or more of the at least one SSBs or CSI-RSs to perform the one or more LBT attempts, according to the counts of failed LBT attempts.

In some embodiments, the wireless communication device may determine a count of failed LBT attempts for each synchronization signal block (SSB) corresponding to a respective one of the plurality of beams. In some embodiments, the wireless communication device may select a first beam of the plurality of beams, according to the counts of failed LBT attempts. In some embodiments, a count of failed LBT attempts (among/from the one or more LBT attempts) for a first SSB corresponding to a first beam may comprise a maximum value of a counter prior to a timer expiring or restarting. In some embodiments, the counter may increment in value responsive to a failed LBT attempt. In some embodiments, the timer may start or restart responsive to a failed LBT attempt. In some embodiments, the counter may set to 0 (e.g., reset to an initial/default value) when the timer expires. In some embodiments, the counter may increment in value responsive to a failed LBT attempt. In some embodiments, the timer may start or restart responsive to a failed LBT attempt when the counter's value is 0 (e.g., at this or other defined/initial/default value).

In some embodiments, the wireless communication device may receive an indication of the plurality of beams via radio resource control (RRC) signaling from a wireless communication node. In some embodiments, the wireless communication device may perform the one or more LBT attempts on each of the plurality of beams for a transmission using a configured grant. In some embodiments, the wireless communication device may select a first beam from the plurality of beams for the transmission using the configured grant. In some embodiments, selecting the first beam may comprise determining, by the wireless communication device, a successful LBT attempt (from the one or more LBT attempts) occurred on the first beam of the plurality of beams, prior to any other successful LBT attempt. In some embodiments, selecting the first beam may comprise determining, by the wireless communication device, that the first beam of the plurality of beams has a count of failed LBT attempts that is lower than (or lower than and/or equal to) those of others of the plurality of beams.

In some embodiments, the wireless communication device may receive an indication of the plurality of beams via medium access control control element (MAC-CE) signaling from a wireless communication node. In some embodiments, the wireless communication device may perform the one or more LBT attempts on each of the plurality of beams. In some embodiments, the wireless communication device may perform the one or more LBT attempts for a transmission using an uplink control channel resource. In some embodiments, the wireless communication device may select a first beam from the plurality of beams for the transmission using the uplink control channel resource. In some embodiments, selecting the first beam may comprise determining, by the wireless communication device, a successful LBT attempt occurred on the first beam of the plurality of beams, prior to any other successful LBT attempt. In some embodiments, selecting the first beam may comprise determining, by the wireless communication device, that the first beam of the plurality of beams has a count of failed LBT attempts that is lower than those of others of the plurality of beams.

In some embodiments, the wireless communication device may determine a count of failed LBT attempts for each of the plurality of beams. In some embodiments, the count of failed LBT attempts for a first beam may comprise a maximum value of a counter prior to a timer expiring or restarting. In some embodiments, the counter may increment in value responsive to a failed LBT attempt. In some embodiments, the timer may start or restart responsive to a failed LBT attempt. In some embodiments, the counter may set to 0 when the timer expires. In some embodiments, the timer may start or restart responsive to a failed LBT attempt when the counter's value is 0. In some embodiments, the counter may increment in value responsive to a failed LBT attempt when the counter's value is 0. In some embodiments, the timer may stop when the counter's value reaches a threshold prior to the timer expiring or restarting. In some embodiments, the counter may set to 0 (e.g., reset to this or another initial/default/defined value) when the counter's value reaches a threshold prior to the timer expiring or restarting. In some embodiments, the counter may set to 0 when the timer expires and the counter's value fails to reach the threshold. In some embodiments, the counter may increment in value (e.g., increment by 1 or other defined value) responsive to a failed LBT attempt. In some embodiments, the counter's value may set to 0 responsive to a successful LBT attempt.

In some embodiments, the counter's value reaching the threshold may trigger beam failure recovery for a wireless communication device in a primary cell of a master or secondary cell group (SpCell). In some embodiments, when the counter's value reaches the threshold, a wireless communication device in a SpCell may switch from a first bandwidth part (BWP) to a second BWP in which to perform a random access procedure. In some embodiments, when the counter's value reaches the threshold, a wireless communication device in a SpCell may report a consistent LBT failure to an upper layer, when the counter's value reaches the threshold in a current active BWP. In some embodiments, the counter's value reaching the threshold may trigger beam failure recovery for a wireless communication device in a secondary cell (SCell). In some embodiments, when the counter's value reaches the threshold, a wireless communication device in a SCell may report a consistent LBT failure to a wireless communication node via medium access control control element (MAC-CE) signaling. In some embodiments, when the counter's value reaches the threshold, a wireless communication device in a SCell may switch from a first bandwidth part (BWP) to a second BWP in which to perform a random access procedure.

In some embodiments, the wireless communication device in a secondary cell (SCell) may determine that a first synchronization signal block (SSB) or channel state information reference signal (CSI-RS) has a reference signal received power (RSRP) that is above a first threshold. In some embodiments, the wireless communication device in a SCell may determine that a first SSB or CSI-RS has a received signal strength indicator (RSSI) that is below a second threshold. In some embodiments, the wireless communication device may report an identification of the first SSB or CSI-RS to a wireless communication node.

In some embodiments, the wireless communication device in a primary cell of a master or secondary cell group (SpCell), may transmit one or more indices to a wireless communication node via medium access control control element (MAC-CE) signaling. In some embodiments, the one or more indices may be indicative of one or more of the plurality of beams on which a consistent LBT failure has occurred. In some embodiments, the wireless communication device may receive a subset of the plurality of beams to monitor from a wireless communication node. In some embodiments, the wireless communication device may monitor a count of failed LBT attempts for the subset of the plurality of beams. In some embodiments, the wireless communication device may determine a subset of the plurality of beams to monitor. In some embodiments, the wireless communication device may monitor a count (e.g., a number or other statistics) of failed LBT attempts for each of the subset of the plurality of beams.

A wireless communication device (e.g., a UE, a terminal, or a served node) may count/calculate a number of LBT failures (e.g., failed LBT attempts) for each beam when directional LBT is used. A wireless communication node (e.g., a ground terminal, a base station, a gNB, an eNB, or a serving node) may indicate/specify one or more available beams for spatial reuse (SR) and/or configured grant. The wireless communication device may perform/execute LBT in the one or more beams prior to performing/initiating a transmission (e.g., of a random access preamble). If at least one of the beams results in a successful LBT attempt, the wireless communication device may perform/complete the corresponding transmission. In some embodiments, the wireless communication device may select/identify/determine at least one beam with a light load based on one or more uplink LBT failure statistics (e.g., a count of failed LBT attempts).

For downlink beam detection, the wireless communication device may count/calculate a downlink LBT failure number when an out-of-sync occurrence (e.g., caused by a LBT failure) is determined/distinguished/identified. An out-of-sync occurrence may refer to or include a discrepancy/difference between a signal/data transmitted/provided from one device and the signal/data received/processed by another device. For a wireless communication device in a primary cell of a master or secondary cell group (SpCell), a number of downlink LBT failures reaching or exceeding a threshold may trigger/cause/initiate beam failure recovery (BFR). In some embodiments, the wireless communication device may switch to another downlink bandwidth part (BWP) when the downlink LBT failure number reaches or exceeds the threshold. A random access procedure may be triggered/caused/initiated responsive to switching to another BWP. The corresponding uplink BWP may be configured with a random access channel (RACH) resource. For a wireless communication device in a secondary cell (SCell), a number of downlink LBT failures reaching or exceeding a threshold may trigger/cause/initiate BFR. The wireless communication device may report/indicate/specify at least one beam to the wireless communication node using BFR medium access control control element (MAC-CE). If one or more downlink LBT failures are triggered, the wireless communication device may report the downlink LBT failure (s) using a downlink LBT failure MAC-CE.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

FIGS. 3-6 illustrate various medium access control control element (MAC-CE) formats for reporting the results of one or more listen before talk (LBT) attempts, in accordance with some embodiments of the present disclosure.

DETAILED DESCRIPTION

Figure 1:
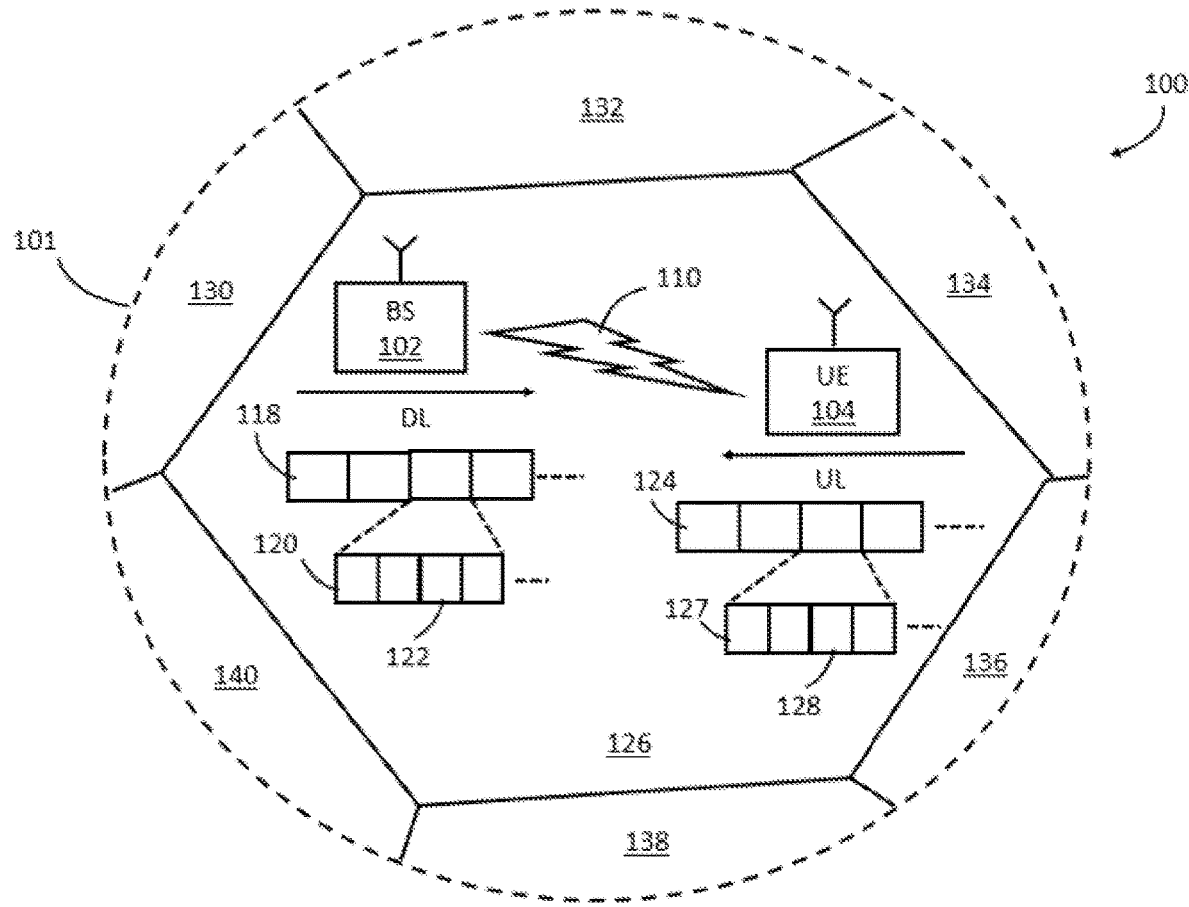
FIG. 1 illustrates an example cellular communication network in which techniques disclosed herein may be implemented, in accordance with an embodiment of the present disclosure.

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

The following acronyms are used throughout the present disclosure:

| Acronym | Full Name |
|---|---|
| 3GPP | 3rd Generation Partnership Project |
| 5G | 5th Generation Mobile Networks |
| 5G-AN | 5G Access Network |
| 5G gNB | Next Generation NodeB |
| 5G-GUTI 5G- | Globally Unique Temporary UE Identify |
| AF | Application Function |
| AMF | Access and Mobility Management Function |
| AN | Access Network |
| ARP | Allocation and Retention Priority |
| CA | Carrier Aggregation |
| CM | Connected Mode |
| CMR | Channel Measurement Resource |
| CSI | Channel State Information |
| CQI | Channel Quality Indicator |
| CSI-RS | Channel State Information Reference Signal |
| CRI | CSI-RS Resource Indicator |
| CSS | Common Search Space |
| DAI | Downlink Assignment Index |
| DCI | Downlink Control Information |
| DL | Down Link or Downlink |
| DN | Data Network |
| DNN | Data Network Name |
| ETSI | European Telecommunications Standards Institute |
| FR | Frequency range |
| GBR | Guaranteed Bit Rate |
| GFBR | Guaranteed Flow Bit Rate |
| HARQ | Hybrid Automatic Repeat Request |
| MAC-CE | Medium Access Control (MAC) Control Element (CE) |
| MCS | Modulation and Coding Scheme |
| MBR | Maximum Bit Rate |
| MFBR | Maximum Flow Bit Rate |
| NAS | Non-Access Stratum |
| NF | Network Function |
| NG-RAN | Next Generation Node Radio Access Node |
| NR | Next Generation RAN |
| NZP | Non-Zero Power |
| OFDM | Orthogonal Frequency-Division Multiplexing |
| OFDMA | Orthogonal Frequency-Division Multiple Access |
| PCF | Policy Control Function |
| PDCCH | Physical Downlink Control Channel |
| PDSCH | Physical Downlink Shared Channel |
| PDU | Packet Data Unit |
| PUCCH | Physical uplink control channel |
| PMI | Precoding Matrix Indicator |
| PPCH | Physical Broadcast Channel |
| PRI | PUCCH resource indicator |
| QoS | Quality of Service |
| RAN | Radio Access Network |
| RAN CP | Radio Access Network Control Plane |
| RAT | Radio Access Technology |
| RBG | Resource Block Group |
| RRC | Radio Resource Control |
| RV | Redundant Version |
| SM NAS | Session Management Non Access Stratum |
| SMF | Session Management Function |
| SRS | Sounding Reference Signal |
| SS | Synchronization Signal |
| SSB | SS/PBCH Block |
| TB | Transport Block |
| TC | Transmission Configuration |
| TCI | Transmission Configuration Indicator |
| TRP | Transmission/Reception Point |
| UCI | Uplink Control Information |
| UDM | Unified Data Management |
| UDR | Unified Data Repository |
| UE | User Equipment |
| UL | Up Link or Uplink |
| UPF | User Plane Function |
| USS | UE Specific Search Space |

1. Mobile Communication Technology and Environment

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node) and a user equipment device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
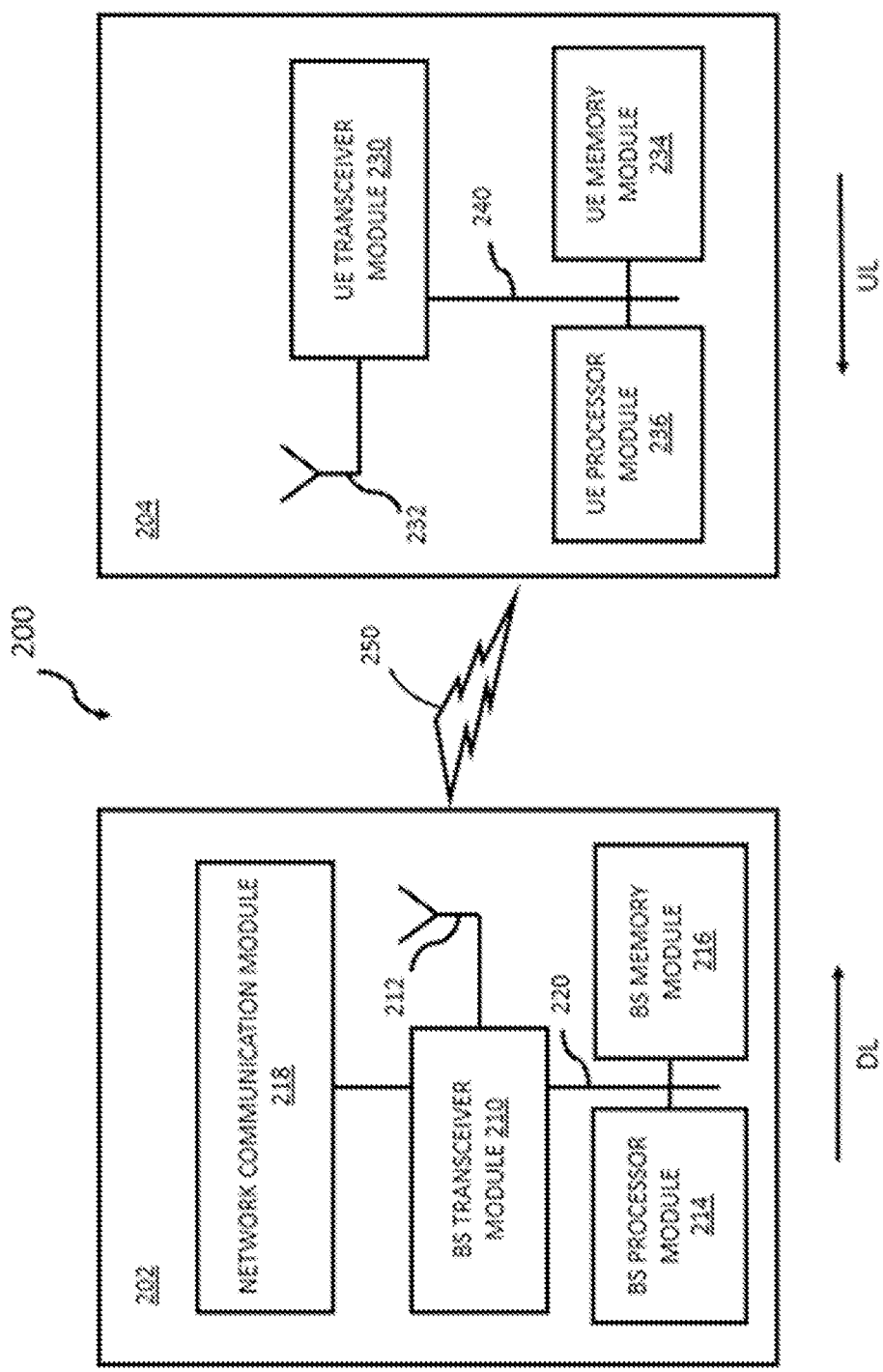
FIG. 2 illustrates a block diagram of an example base station and a user equipment device, in accordance with some embodiments of the present disclosure.

FIG. 2 illustrates a block diagram of an example wireless communication system 200 for transmitting and receiving wireless communication signals (e.g., OFDM/OFDMA signals) in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232.

In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

2. Systems and Methods for Direction-Based Listen Before Talk (LBT)

In certain systems (e.g., Rel-16 shared/unlicensed spectrum and/or other systems), one or more channels and/or signals (e.g., physical channels, physical signals, and/or other channels or signals) may be transmitted using one or more beams other than narrow beams in the sub-7 GHz spectrum (or other spectrum). Support for listen before talk (LBT) may be unnecessary if the channels and/or signals are transmitted using the one or more beams. For frequency bands that are above 52.6 GHz (or other frequencies), beam-based transmissions and/or receptions may enable/cause a gain/increase in power. The power gain may overcome the shortage of coverage of the millimeter wave (mmWave) spectrum.

Beam-based LBT may have a limited/restricted range of direction for signal reception. Therefore, the outcomes of the LBT may depend on the occurrence of at least one potential interference in the specific direction of the LBT beam. As a result, the success rate of beam-based LBT may increase/improve (e.g., given the availability of alternative candidate beam directions) compared to the success rate of omni-directional LBT. In certain scenarios (e.g., dense deployment scenarios), spatial reuse may improve.

In some embodiments, transmissions may be blocked when beam-based LBT is introduced. One or more spatial dimension enhancements may be considered if spatial dimension LBT is used. The systems and methods presented herein include a novel approach for direction-based LBT to improve/enhance spatial reuse and spatial dimension by at least 25% (e.g., 35, 45 or other percent) for example.

A. EMBODIMENT 1

Multiple Synchronization Signal Block (SSB) Selection for Msg1

In some embodiments, beam-based LBT may be used/enabled/applied in high frequencies (e.g., high frequency spectrum). Similar to omni-directional LBT, one or more transmissions may face blockage/obstruction/occlusion in beam-based LBT. Therefore, certain enhancements (e.g., spatial dimension enhancements or other enhancements) to beam-based LBT may be considered.

In a random access procedure, one or more preamble transmissions (e.g., RACH preamble, physical random access channel (PRACH) preamble, and/or other transmissions that initiate synchronization/communication with a wireless communication node) may face blockage/obstruction/occlusion. In some embodiments, multiple spatial dimension transmission opportunities may be considered to reduce/decrease/minimize LBT impact. In certain spectra (e.g., licensed spectrum), at least one SSB may be selected/identified/specified. A wireless communication device (e.g., a UE, a terminal, or a served node) may select/identify/specify a (random access) preamble and/or a PRACH occasion based on the selected SSB. In some embodiments, the lower layer (or other layers) may perform/complete one or more (random access) preamble transmissions in an uplink beam (e.g., an uplink beam corresponding to the selected SSB). For other spectra (e.g., unlicensed spectrum), the wireless communication device may select one or more SSBs and/or channel state information reference signals (CSI-RSs) meeting or exceeding one threshold. For each SSB and/or CSI-RS, the wireless communication device may select the following available PRACH occasion/resource from one or more PRACH occasions. The one or more PRACH occasions may correspond to the selected SSB and/or CSI-RS. For each SSB and/or CSI-RS, the wireless communication device may select at least one (random access) preamble based on the selected SSB and/or CSI-RS.

Responsive to completing the selecting, the wireless communication device may calculate/compute/determine a preamble transmission power and/or a random access radio network temporary identifier (RA-RNTI) for each selected SSB and/or CSI-RS. The media access control (MAC) layer (or other layers) may indicate/provide/specify the selected PRACH occasion/resource, corresponding RA-RNTI, preamble index, preamble transmission power, and/or other information for each selected SSB and/or CSI-RS, to the lower (e.g., physical) layer.

The physical/lower layer (or other layers) may perform/complete the beam-based LBT prior to transmitting/sending/broadcasting the preamble for each selected PRACH resource. If one or more LBT attempts are successful, the wireless communication device may select at least one beam with a successful LBT attempt to transmit the preamble. If there are other ongoing LBT attempts, the wireless communication device may stop/suspend/terminate the ongoing LBT attempts. The steps discussed herein may be used for a 4-step contention based random access procedure, 4-step contention free random access procedure, 2-step random access procedure, and/or other procedures.

B. EMBODIMENT 2

Multiple SSB Selection for Msg1, Physical Downlink Control Channel (PDCCH) Order In some embodiments, beam-based LBT may be used/enabled/applied in high frequencies. One or more transmissions may face blockage/obstruction/occlusion/interference in beam-based LBT. Therefore, certain enhancements (e.g., spatial dimension enhancements or other enhancements) to beam-based LBT may be considered.

In a random access procedure, one or more preamble transmissions (e.g., RACH preamble, PRACH preamble, and/or other transmissions that initiate synchronization/communication with the wireless communication node) may face blockage/obstruction/occlusion/interference. In some embodiments, availability of multiple spatial dimension transmission opportunities may be considered to reduce/decrease/minimize LBT impact. For example, the order of the PDCCH (or other downlink channels) may trigger/cause/initiate a random access procedure. For the random access procedure triggered by the PDCCH order, the wireless communication device may indicate/specify at least one SSB in the current specification. A wireless communication node (e.g., a ground terminal, a base station, a gNB, an eNB, or a serving node) may use downlink control information (DCI) and/or other information to indicate/specify one or more SSBs and/or one or more preamble indices corresponding to each SSB. The wireless communication node may indicate the one or more SSBs and/or preamble indices to provide one or more transmission opportunities. The preamble indices may provide information to identify/select one or more preambles. At least one PRACH mask index may be used for the one or more SSBs. The PRACH mask index may indicate/specify/identify at least one PRACH resource for transmitting/sending/broadcasting the (random access) preamble(s).

In some embodiments, a SSB index and/or a preamble index may utilize 12 (or other numbers of) bits. At least 6 bits may be used to indicate/specify the SSB index and/or the preamble index. The wireless communication node may use a DCI (e.g., DCI_0 or other type and/or format of DCI) to indicate at least 2 SSB indices and/or 2 preamble indices corresponding to the 2 SSB indices.

The wireless communication device may receive/obtain the DCI (or other information) indicating the one or more SSBs. Responsive to receiving the DCI, the wireless communication device may perform LBT in one or more uplink beams. The one or more uplink beams may correspond to one or more SSBs. If at least one beam has a successful LBT attempt, the wireless communication device may perform/achieve/complete a preamble transmission.

a. Wireless Communication Node Side

In some embodiments, a random access preamble index may utilize at least 1 to 6 bits according to ra-PreambleIndex (or other indices) in certain implementations (e.g., Clause 5.1.2 of [8, TS38.321]). In some embodiments, the random access preamble index may utilize at least 2 to 6 bits according to ra-PreambleIndex (or other indices) in certain implementations (e.g., Clause 5.1.2 of [8, TS38.321]).

An uplink (UL) and/or supplementary UL (SUL) indicator may utilize 1 (or other numbers of) bit. In certain cases, the value of the random access preamble index may correspond to a value other than all zeros. The wireless communication device may be configured with supplementary Uplink (or other parameter/setting) in ServingCellConfig (or other configuration) in the cell. Therefore, a field of the UL/SUL indicator may specify an UL carrier in the cell to transmit the PRACH (e.g., according to Table 7.3.1.1.1-1). Otherwise, the field may be reserved.

In some embodiments, a secondary synchronization (SS)/physical broadcast channel (PBCH) index may utilize at least 1 to 6 bits. In some embodiments, the SS/PBCH index may utilize at least 2 to 6 bits. In certain scenarios, the value of the random access preamble index corresponds to a value other than all zeros. Therefore, a field of the SS/PBCH index may specify the SS/PBCH to be used to determine the RACH occasion for the PRACH transmission. Otherwise, the field may be reserved.

In some embodiments, a PRACH mask index may utilize at least 4 bits. In certain cases, the value of the random access preamble index may correspond to a value other than all zeros. Therefore, a field of the PRACH mask index may specify or indicate the RACH occasion associated with the SS/PBCH. The SS/PBCH may be indicated by the SS/PBCH index for the PRACH transmission (e.g., according to Clause 5.1.1 of [8, TS38.321]). Otherwise, this field may be reserved. In some embodiments, at least 10 bits may correspond to reserved bits. The reserved bits may be utilized for operation in a cell with shared spectrum channel access. In some embodiments, 12 bits may be utilized for the reserved bits.

C. EMBODIMENT 3A

Two Thresholds for Preamble

In certain specifications, the wireless communication device may select/determine/identify at least one SSB and/or CSI-RS based on a reference signal received power (RSRP) and/or one configured threshold. The wireless communication device may select/identify/determine one or more SSBs/CSI-RSs with associated measurements/metrics that are above the threshold. In some embodiments, the wireless communication device may consider the RSRP (e.g., L1-RSRP) and/or a received signal strength indicator (RSSI) to select the one or more SSBs/CSI-RSs (e.g., due to a hidden node). The wireless communication device may select/determine/identify one or more SSBs and/or CSI-RSs based on the RSRP and/or the RSSI (e.g., RSSI/CO) of each SSB/CSI-RS. A first threshold associated to the RSRP may be configured to select/identify/categorize the one or more SSBs and/or CSI-RSs. A second threshold associated to the RSSI may be configured to select/identify/categorize the one or more SSBs and/or CSI-RSs. System information, a radio resource control (RRC) message, and/or other messages or information may configure the threshold(s).

For transmitted SSBs/CSI-RSs, the wireless communication device may configure the first threshold (e.g., rsrp-thresholdSSB) and/or the second threshold (e.g., rssi-thresholdSSB) using system information and/or the RRC message. If the random access procedure is triggered, the wireless communication device may select one or more SSBs/CSI-RS with an associated RSRP that meets or exceeds the first threshold. Among the selected SSBs/CSI-RSs, the wireless communication device may select one or more SSBs/CSI-RSs with a RSSI below the second threshold. In some embodiments, at least the following four cases may occur:

Case 1: One or more SSBs/CSI-RSs may have a corresponding RSRP that meets or exceeds the first threshold (e.g., rsrp-thresholdSSB). The one or more SSBs/CSR- RSs may have a corresponding RSSI that is below the second threshold (e.g., rssi-thresholdSSB). The wireless communication device may select at least one SSB/CSI-RS from the one or more SSBs/CSI-RSs, e.g., according to one or more predefined rules or configurations. For example, the wireless communication device may select/identify one or more SSBs/CSI-RSs with a RSRP that meets the first threshold or exceeds the first threshold by the largest amount. In another example, the wireless communication device may select one or more SSBs/CSI-RSs in a random/arbitrary manner.

Case 2: One or more SSBs/CSI-RSs may have a corresponding RSRP that meets or exceeds the first threshold. The one or more SSBs/CSI-RSs may have a corresponding RSSI that meets or exceeds the second threshold (e.g., none of the one or more SSBs have a RSSI that is below the second threshold). The wireless communication device may identify/specify the SSBs/CSI-RSs that have a RSRP that meets or exceeds the first threshold. The wireless communication device may select at least one SSB/CSI-RS among the identified SSBs/CSI-RSs using the associated RSSI measurement result(s) and/or according to one or more predefined rules or configurations. For example, the wireless communication device may select one or more SSBs/CSI-RSs with a RSSI that exceeds the second threshold by the largest amount. In another example, the wireless communication device may select one or more SSBs/CSI-RSs in a random/arbitrary manner.

Case 3: One or more SSBs/CSI-RSs may have a corresponding RSSI (e.g., RSSI/CO) that is below the second threshold. The one or more SSBs/CSI-RSs may have a corresponding RSRP that is below the first threshold. Therefore, at least one SSB/CSI-RS may be selected according to a wireless communication device implementation and/or one or more predefined rules or configurations. For example, the wireless communication device may select at least one SSB/CSI-RS with a RSRP that is nearest/closest to the first threshold. In another example, the wireless communication device may select one or more SSBs/CSI-RSs in a random/arbitrary manner.

Case 4: All of the SSBs/CSI-RSs may have a corresponding RSRP that is below the first threshold. All of the SSBs/CSI-RSs may have a corresponding RSSI that meets or exceeds the second threshold. In some embodiments, at least one SSB/CSI-RS may be selected according to a wireless communication device implementation and/or according to one or more predefined rules or configurations. For example, the wireless communication device may select at least one SSB/CSI-RS with a RSRP that is nearest/closest to the first threshold. In another example, the wireless communication device may select one or more SSBs/CSI-RSs in a random/arbitrary manner.

In some embodiments, one or more SSBs/CSI-RSs may be selected/determined/identified using the selection principles/guidelines/rules/configurations disclosed herein. The wireless communication device may perform one or more LBTs based on the selected SSBs/CSI-RSs. If at least one beam results in a successful LBT attempt, the wireless communication device may perform a preamble transmission using the at least one beam. Responsive to performing the preamble transmission(s), the wireless communication device may stop/suspend other ongoing LBT attempts. In some embodiments, the wireless communication node may configure a threshold associated to the RSSI using a system information block type 1 (SIB1), a RRC reconfiguration, and/or other information.

D. EMBODIMENT 3B

SSB Selection Based on LBT Failure Outcome

In certain specifications, the wireless communication device may select/determine one or more SSBs/CSI-RSs based on the RSRP and/or at least one configured threshold. The wireless communication device may select one or more SSBs/CSI-RSs with a corresponding RSRP that meets and/or exceeds the threshold. In some embodiments, the wireless communication device may select one or more SSBs/CSI-RSs based on UL LBT failure outcome statistics (e.g., counts of failed LBT attempts, corresponding to each SSB/CSI-RS/beam for instance).

One or more SSBs/CSI-RSs may have a RSRP that meets or exceeds a first threshold (e.g., rsrp-ThresholdSSB) when a random access procedure is triggered/initiated. The wireless communication device may select at least one SSB/CSI-RS using UL LBT failure statistics (e.g., counts of beam-specific LBT failures for each SSB/CSI-RS/beam). The wireless communication device may select/identify one or more SSBs/CSI-RSs with a low load (e.g., SSBs/CSI-RSs with a low failure count).

E. EMBODIMENT 4

LBT Failure Statistics (per SSB) Based on (or per) Directional Beam

In certain shared spectra (e.g., unlicensed spectrum), uplink transmissions may use/implement LBT failure detection/recovery. The wireless communication device may count/calculate/track the number of LBT failures (e.g., number of failed LBT attempts) for the uplink transmissions. The wireless communication device may count/calculate/use a number of LBT failures per directional beam to select/identify/determine/use a beam with a light load (e.g., a beam with a low failure count). For example, for SR and/or configured grant transmissions, the wireless communication device may select/identify/use at least one light load beam if one or more beams are indicated/specified.

a. The MAC Layer

In some embodiments, the wireless communication device may count/determine/calculate the number of UL LBT failures (e.g., a number of failed LBT attempts) using a counter and/or a timer. The wireless communication device may count the number of UL LBT failures per beam (e.g., a number of failed LBT attempts for each SSB corresponding to at least one beam). At least one of the following two approaches may be considered/used/implemented:

Approach 1: For each beam, the wireless communication device may receive/obtain a LBT failure indication (e.g., failed LBT attempt) from one or more lower layers. If the LBT failure indication is received, the counter may increase/increment (e.g., by a value of 1) and/or the timer may start/restart. The counter may reset (e.g., set to 0 or other initial/default/defined value) once the timer expires. In this approach, the timer may start/restart with each failed LBT attempt. The timer may run its full course/duration (e.g., until expiration) unless another failed LBT attempt occurs (e.g., prior to expiration).

Approach 2: For each beam, the wireless communication device may receive/obtain a LBT failure indication from one or more lower layers. If the LBT failure indication is received, the counter may increase/increment (e.g., by a value of 1 or other default/defined value). If the counter is equal to zero and a LBT failure indication is received, the timer may start/initiate. The counter may reset (e.g., set to 0 or other initial/default/defined value) once the timer expires. In this approach, the timer may run its full course/duration (e.g., until expiration) prior to restarting the timer (e.g., run its full course/duration again).

b. The Physical/Lower Layer

The wireless communication device may fail to access one or more channels prior to an intended/scheduled UL transmission to the wireless communication node. If the wireless communication device fails to access the channel (s), Layer 1 (or other layers) may notify/inform/indicate the channel access failure per beam to one or more higher layers (e.g., MAC layer).

F. EMBODIMENT 5

Configured Grant Selection Based on LBT Failure Outcome

For configured grant transmissions, the wireless communication node may use a RRC message (or other messages) to indicate/specify one or more transmission beams. The wireless communication device may receive/obtain the indication of the one or more transmissions beams via the RRC message. In some embodiments, omni-directional LBT may be performed/used/implemented/enabled. If omni-directional LBT is performed and there is at least one failed LBT attempt, none of the one or more beams may be used. When directional LBT is used/performed, each beam may result in/correspond to an individual LBT result (e.g., failed LBT attempt or successful LBT attempt). The individual LBT result may be associated with an individual beam. Therefore, one or more transmission beams may be indicated/specified for a particular configured grant.

The wireless communication node may indicate/specify/provide/determine the one or more transmission beams for a configured grant. At least one of the following two approaches may be used/considered/implemented:
 Approach 1: The wireless communication device may perform at least one LBT attempt in one or more beams. If at least one beam/attempt results in a successful LBT attempt, the wireless communication device may perform at least one configured grant transmission using the at least one beam. The wireless communication device may determine that the successful LBT attempt occurred on a first beam (e.g., which is then selected for preamble transmission), prior to any other successful LBT attempts.
 Approach 2: The wireless communication device may select/identify/determine at least one beam with a light load using the UL LBT failure number (e.g., a beam with a low failure count), e.g., for preamble transmission. Therefore, the wireless communication device may select/determine/identify at least one beam with a count of failed LBT attempts that is lower than those of other beams.

The approaches may reduce/decrease the impact of LBT on the configured grant transmission(s). In some embodiments, the wireless communication node may configure one or more sounding reference signal (SRS) resource indications. The wireless communication node may send/transmit the SRS indications (or other indications) to the wireless communication device. The wireless communication node may use RRC signaling (or other types of signaling) to configure and/or send the one or more SRS resource indications.

G. EMBODIMENT 6

SR Resource Selection Based on LBT Failure Outcome

In certain specifications, the wireless communication device may determine/specify at least one available beam for each uplink control channel (e.g., physical uplink control channel (PUCCH) or other uplink channels) resource. The wireless communication device may utilize MAC-CE signaling (or other types of signaling) to receive an indication that at least one beam is available. The wireless communication node may send/transmit/broadcast the indication(s) via MAC-CE signaling (or other types of signaling). In some embodiments, omni-directional LBT may be performed/used/implemented/enabled. If omni-directional LBT is performed and there is at least one failed LBT attempt, none of the one or more beams may be used. When directional LBT is used/performed, each beam may result in/correspond to an individual LBT result (e.g., failed LBT attempt or successful LBT attempt). The individual LBT result may be associated with an individual beam. Therefore, one or more transmission beams may be indicated/specified for each uplink control channel resource (e.g., PUCCH resource).

The wireless communication node may indicate/specify/provide/determine the one or more transmission beams for SR using MAC-CE (or other types of signaling). At least one of the following two approaches may be used/considered/implemented:
 Approach 1: The wireless communication device may perform at least one LBT attempt in one or more beams. If at least one beam results in a successful LBT attempt, the wireless communication device may select the at least one beam to perform at least one uplink channel resource transmission. The wireless communication device may determine that the successful LBT attempt occurred on a first beam (that is then selected for use), prior to other successful LBT attempts.
 Approach 2: The wireless communication device may select/identify/determine at least one beam with a light load using the UL LBT failure number (e.g., a beam with a low failure count). Therefore, the wireless communication device may select/determine/identify at least one beam with a count of failed LBT attempts that is lower than those of other beams.

The approaches may reduce/decrease the impact of LBT on the configured grant transmission(s).

H. EMBODIMENT 7

Downlink (DL) LBT Failure

In certain specifications, one or more serving cells may use/implement beam failure detection/recovery. For one or more SpCells, a counter of beam failures may meet or exceed a threshold. In some embodiments, meeting or exceeding the threshold may trigger/cause/initiate a random access procedure. For one or more SCells, beam failure recovery (BFR) may be triggered. If BFR is triggered, the wireless communication device may report/inform/specify at least one SSB/CSI-RS with a RSRP that meets or exceeds the rsrp-ThresholdBF (or other thresholds). The candidate-BeamRSSCellList (or other lists) by a BFR MAC-CE may include the at least one SSB/CSI-RS.

In certain spectra (e.g., the shared spectrum), an SSB/CSI-RS may face blockage/occlusion due to a LBT failure (e.g., LBT failed attempt). In some embodiments, the triggering/initiation of BFR may occur earlier than desired.

In certain protocols (e.g., RAN4), some agreements may be as described below:
SSB-based out-of-sync (OOS) evaluation period:
For estimated signal-to-interference noise ratio (SINR$_{EST}$)≤X dB, the OOS evaluation period:
Option 1: May keep unchanged.
Option 2: May have a fixed extension of number of samples as follows:
L=a defined value for max($T_{SSB}$, $T_{DRX}$)≤40,
L=a defined value for 40<max($T_{DRX}$, $T_{SSB}$)≤320,
L=a defined value for $T_{DRX}$>320
For SINR$_{EST}$>X dB, the OOS evaluation period may be defined or predetermined.
X=[−7 dB]
SINR$_{EST}$ may correspond to the estimated signal-to-interference noise ratio (SINR) at the wireless communication device side.
Option 1: Filtered SINR estimated over evaluation period,
Option 2: Current SSB SINR estimate,
Option 3: Last available SSB SINR,
Other options are not precluded In some embodiments, an SINR may meet or exceed a certain threshold. If the SINR meets or exceeds the threshold, the wireless communication device may distinguish/determine/identify one or more OOS reasons. For example, OOS may be caused/triggered by one or more LBT failed attempts, poor quality of a channel, blockage, and/or other OOS reasons. The wireless communication device may determine/identify one or more reasons for the OOS. Responsive to determining the reason(s) for the OOS, the wireless communication device may identify and count the beam failures caused by the failed LBT attempts for each beam. In other words, the wireless communication device may determine the count of failed LBT attempts for each beam. The wireless communication device may count the beam failures separately (e.g., from those due to reasons other than failed LBT attempts) to avoid triggering/initiating/causing the BFR earlier than desired. The beam failure count (or count of failed LBT attempts) may be used to calculate/determine one or more LBT failure (e.g., DL LBT failure) statistics.

At least one of the following approaches may be used/considered/implemented for calculating/determining the LBT failure statistics:
Approach 1: Certain approaches may employ/use a counter and/or a timer. In some embodiments, the wireless communication device may receive/obtain at least one LBT failure indication (or other indicators). Responsive to receiving the indication, the timer may start/restart and/or the counter may increase/increment by a value (e.g., by a value of 1). The timer may start or restart responsive to/at each failed LBT attempt. Therefore, the timer may run its full course/duration (e.g., until timer expiration) unless another failed LBT attempt occurs (e.g., prior to timer expiration). The counter may change its value to 0 (e.g., reset to a defined/initial value) once the timer expires.
Approach 2: Certain approaches may employ/use a counter and/or a timer. In some embodiments, the wireless communication device may receive/obtain an indication of a LBT failure from one or more lower layers. If the wireless communication device receives the indication and the counter has a value of zero, the timer may start/initiate. Responsive to receiving/obtaining the indication, the counter may increase/increment by a value (e.g., by value of 1 or other default/defined value). If the counter meets or exceeds a certain threshold while the timer is running its course, the wireless communication device may perform one or more operations (e.g., described below). If the counter meets or exceeds the threshold while the timer is running its course, the timer may stop/restart and/or the counter may set to zero (e.g., reset or re-initialize to a defined/initial value). If the timer expires and the counter fails to meet or exceed the threshold, the counter may set to zero.
Approach 3: Certain approaches may employ/use a counter. In some embodiments, a number of consistent LBT failures (e.g., candidate beams each declared/verified/confirmed/decided as a LBT failure, when certain condition(s) and/or threshold is/are met) may be identified/indicated/counted/calculated. The wireless communication device may receive/obtain an indication of a LBT failure from one or more lower layers. If the wireless communication device receives/obtains the indication, the counter may increment/increase by a certain value (e.g., by a value of 1). Responsive to receiving an indication of a LBT success, the counter may change its value to zero (e.g., set to 0). If the counter meets or exceeds a threshold, at least one of the following procedures may be performed.

For a wireless communication device in a SpCell, if a counter (e.g., DL LBT failure counter) meets or exceeds a threshold, at least one of the following cases may be considered:
Case 1: In some embodiments, BFR may be caused/triggered/initiated. If BFR is triggered, the wireless communication device may perform a random access procedure. If BFR is triggered, the wireless communication device may report/inform/specify/indicate at least one available beam to the wireless communication node using RACH (or other resources).
Case 2: If a counter (e.g., DL LBT failure counter) meets or exceeds the threshold, the wireless communication device may switch/change to a DL bandwidth part (BWP). The DL BWP may relate to an UL BWP configured with a RACH resource (or other resources). Responsive to switching to another BWP, a random access procedure may initiate in the BWP. In some embodiments, one or more LBT failures may be triggered in one or more DL BWPs. If the one or more LBT failures are triggered, the wireless communication device may report/indicate/specify a consistent LBT failure to at least one upper layer.
Case 3: For the wireless communication device in the SpCell, a counter (e.g., DL LBT failure counter) may meet or exceed the threshold in the current active BWP. If the counter meets or exceeds the threshold, the wireless communication device may indicate/specify a consistent LBT failure to one or more upper layers.

A consistent LBT failure (e.g., provided/specified/indicated by the MAC layer or other layers) may trigger/cause a radio link failure (RLF). The wireless communication device may perform a RRC reestablishment procedure (or other procedures).

For a wireless communication device in a SCell, if a counter (e.g., DL LBT failure counter) meets or exceeds a threshold, at least one of the following cases may be considered:

Case 1: In some embodiments, BFR may be caused/triggered/initiated. The wireless communication device may report at least one SSB/CSI-RS with an RSRP that meets or exceeds rsrp-ThresholdBFR (or other thresholds). The in candidateBeamRSSCellList (or other lists) may include/provide/specify the at least one SSB/CSI-RS.

Case 2: In some embodiments, the counter (e.g., DL LBT failure counter) may meet or exceed the threshold. If the counter meets or exceeds the threshold, a consistent LBT failure may be triggered. The wireless communication device may report/inform/communicate the LBT failure to the wireless communication node (e.g., using a new MAC-CE or other signaling).

Case 3: In some embodiments, the counter (e.g., DL LBT failure counter) may meet or exceed the threshold. If the counter meets or exceeds the threshold, the wireless communication device may switch/change to a DL BWP in which to perform a random access procedure. The DL BWP may relate to an UL BWP configured with a RACH resource (or other resources). If the wireless communication device switches to another BWP, the random access procedure may be performed.

Figure 3:
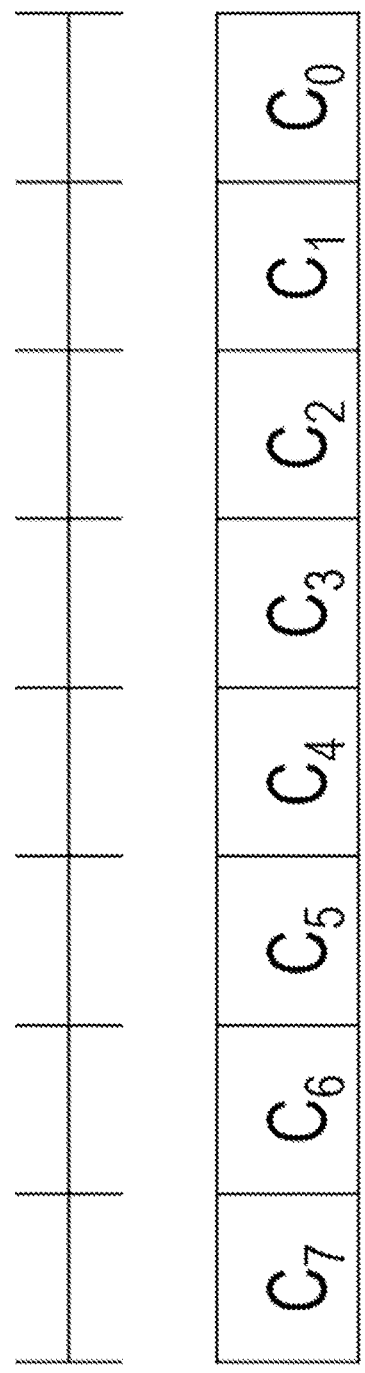

Referring now to FIG. 3, depicted is a MAC-CE format for reporting the results of one or more LBT attempts. For SCells and/or SpCells, a novel/specific MAC-CE may be defined to report a LBT failure to the wireless communication node. The MAC-CE may be referred to as a LBT failure MAC-CE. An example format of the LBT failure MAC-CE is illustrated in FIG. 3. The LBT failure MAC-CE may correspond to an octet format (e.g., Oct 1). The octet of the MAC-CE may correspond to a single row with 8 fields. The LBT failure MAC-CE may report/indicate/specify a LBT failure of at least one serving cell. Each of the serving cells may correspond to one field of the LBT failure MAC-CE (e.g., $C_0$, $C_1$, $C_2$ and/or other fields). For example, if a consistent LBT failure is triggered in a serving cell (e.g., serving cell 0), the value of the corresponding field of the MAC-CE (e.g., $C_0$) may be set to 1 (or other values). Otherwise, the value of the corresponding field (e.g., $C_0$) may be set to 0 (or other values). At least one field of the LBT failure MAC-CE may correspond to at least one serving cell. The fields of the LBT failure MAC-CE may be organized/reported/indicated using one or more sequences. For example, the fields may be organized using the following order/sequence (from left to right): $C_0$, $C_1$, $C_2$, $C_3$, $C_4$, $C_5$, $C_6$, $C_7$.

Figure 4:
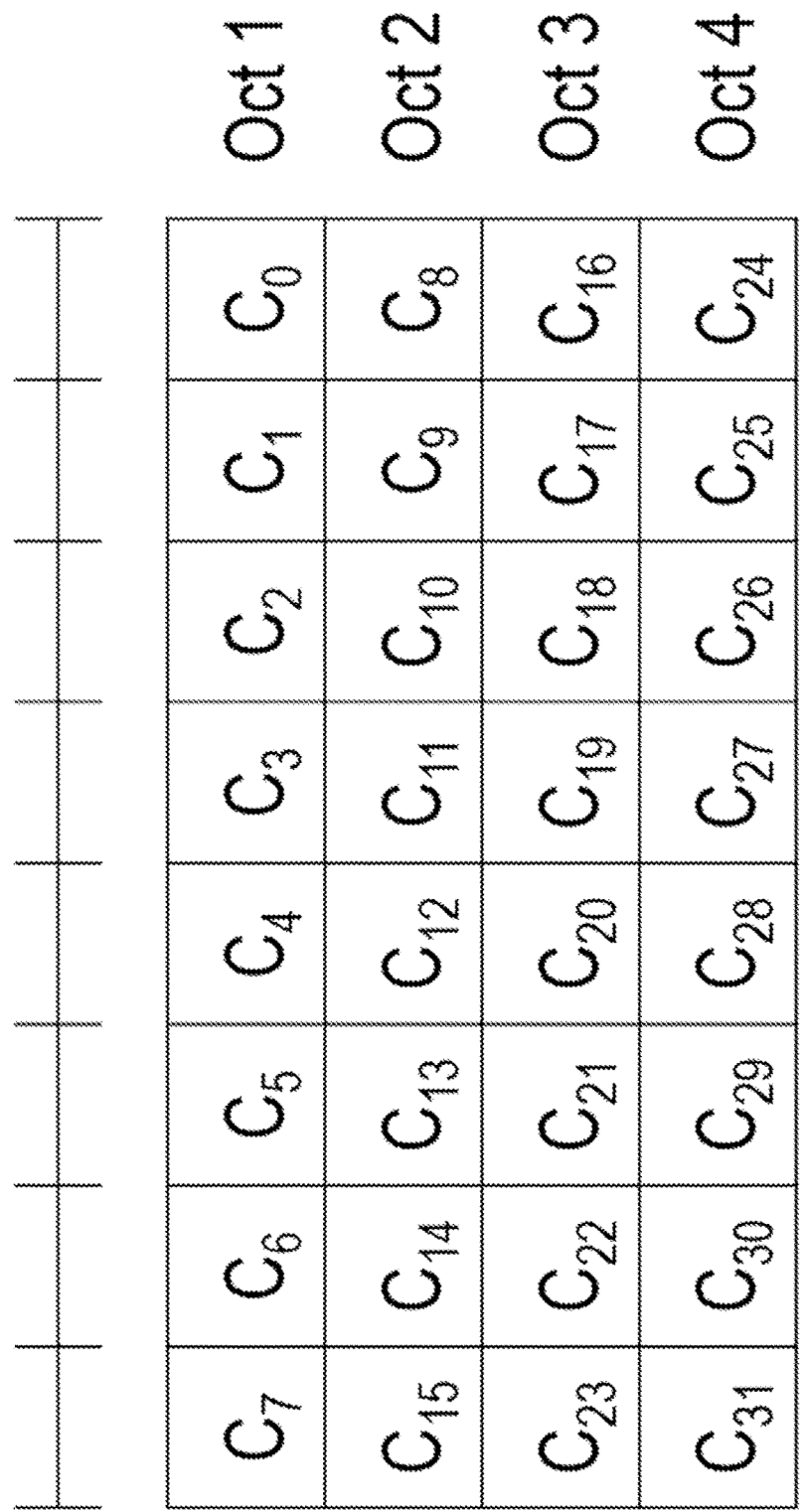

Referring now to FIG. 4, depicted is a MAC-CE format for reporting the results of one or more LBT attempts. For one or more SCells and/or SpCells, a novel/specific/defined MAC-CE may be defined to report a LBT failure to the wireless communication node. In some embodiments, the MAC-CE may be referred to as a LBT failure MAC-CE. An example format of the LBT failure MAC-CE is illustrated in FIG. 4. The LBT failure MAC-CE may correspond to a four (or other numbers) octet format (e.g., Oct 1, Oct 2, Oct 3, and/or Oct 4). Each octet of the MAC-CE may correspond to a single row with 8 fields. The four octet format may concatenate/aggregate/combine the results from one or more serving cells into a single MAC-CE. A LBT failure MAC-CE with a four octet format may report/indicate/specify the LBT failure status of one or more serving cells. Each of the serving cells may correspond to a field of the LBT failure MAC-CE (e.g., $C_0$, $C_1$, $C_2$ and/or other fields). For example, if a consistent LBT failure is triggered (and not cancelled) in a serving cell (e.g., serving cell 1), the value of the corresponding field of the MAC-CE (e.g., $C_1$) may be set to 1 (or other values). Otherwise, the value of the corresponding field (e.g., $C_1$) may be set to 0 (or other values).

In some embodiments, the LBT failure MAC-CE may use a single octet bitmap when the highest ServCellIndex (or other indices) of the MAC entity's serving cell is less than 8. If the highest ServCellIndex of the MAC entity's serving cell is larger than or equal to 8, the LBT failure MAC-CE may use a four octet format. In some embodiments, the wireless communication node may configure/determine/specify the threshold for analyzing/comparing the LBT failure count. The wireless communication node may use a RRC configuration (or other configurations) to configure the threshold. For each SCell, another threshold may be used to select a beam from a list of candidate beams.

I. EMBODIMENT 8

Beam Failure Issue for SCell

In some embodiments, a beam failure may be triggered in a wireless communication device in a SCell. If a beam failure is triggered, the wireless communication device may report/specify/determine an index of a SSB/CSI-RS. The SSB/CSI-RS may have a RSRP that meets or exceeds a first threshold (e.g., rsrp-ThresholdBFR). The candidateBeamRSSCellList of a MAC-CE (or other lists) may include/specify the SSB/CSI-RS. The interference of each beam may differ when directional LBT is used/enabled/implemented. Therefore, the information provided by a RSSI of each beam may be considered/evaluated. An RRC message (or other messages) may configure a second threshold for the RSSI. If beam failure is triggered in a wireless communication device in a SCell, the wireless communication device may report/specify/indicate an SSB/CSI-RS with an RSRP that meets or exceeds the first threshold and a RSSI below the second threshold. The wireless communication device may report an identification of the SSB/CSI-RS. For each SCell, another threshold may be used to select a beam from a list of candidate beams.

J. EMBODIMENT 9

Beam Based LBT Failure Detection

In certain spectra (e.g., the shared spectrum), uplink transmissions may use/implement LBT failure detection/recovery. If a number of LBT failures for the uplink transmissions meets or exceeds a threshold, consistent (or confirmed) LBT failure may be triggered. When beam-based LBT is used/enabled/implemented in high frequencies, the LBT status of each beam may differ. Therefore, separate numbers may specify the number of beam-based LBT failures (e.g., LBT failed attempts for each beam).

a. The MAC Layer

Each beam may be associated with a separate LBT failure number. The LBT failure number for each beam may be compared to a certain threshold. If the LBT failure number meets or exceeds the threshold, a consistent LBT failure may be triggered. For a wireless communication device in a SpCell, a consistent LBT failure may be triggered in the active BWP. If a consistent LBT failure is triggered, the wireless communication device may switch/change to another BPW with RACH resources (or other resources).

The wireless communication device may switch to another BWP to perform a random access procedure. If all BWPs with RACH resources have been tried, the MAC layer may indicate/inform a consistent LBT failure to an upper layer. For a wireless communication device in a SCell, the wireless communication device may indicate/specify/provide/determine one or more indices to the wireless communication node. The one or more indices may indicate/specify the one or more beams on which a consistent LBT failure has occurred.

Figure 5:
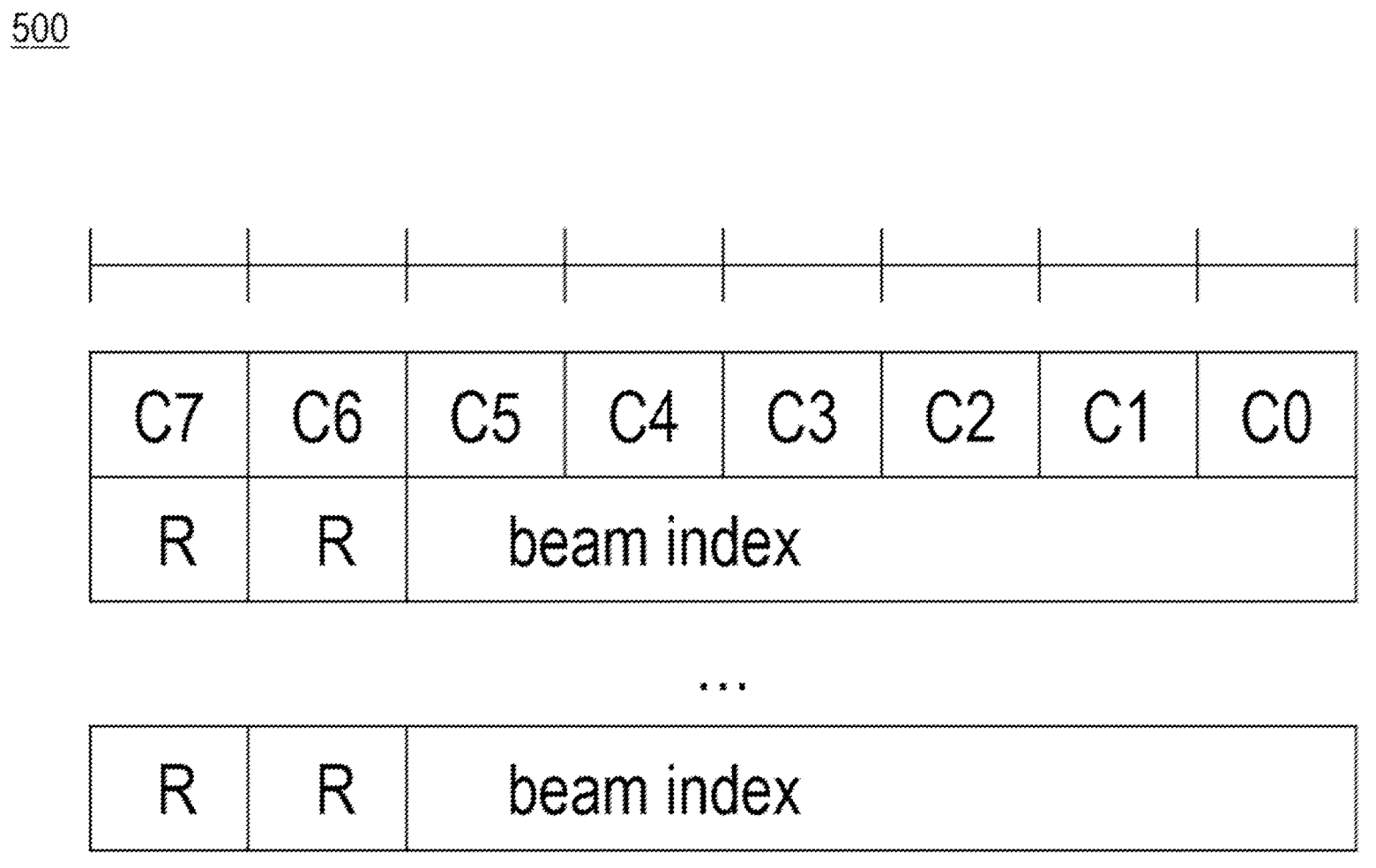

Referring now to FIGS. 5 and 6, depicted are examples of MAC-CE formats for reporting the results of one or more LBT attempts. For a wireless communication device in a SCell, the wireless communication device may report/inform one or more beam indices to the wireless communication node. The one or more beam indices may correspond to the one or more beams on which a consistent LBT failure has been triggered. In certain specifications, the LBT failure MAC-CE may indicate/specify one or more indices of the serving cells on which a LBT failure has been triggered. Certain formats of the LBT failure MAC-CE may be unable to satisfy one or more requirements (e.g., the LBT failure MAC-CE may include one or more beam indices). A novel/defined/specific LBT failure MAC-CE format may indicate/specify/provide one or more serving cell indices and/or one or more beam indices. The MAC-CE format may indicate/specify the serving cell indices and/or beam indices on which a LBT failure has occurred.

For the wireless communication device in a SpCell, the wireless communication device may report/inform/transmit one or more beam indices to the wireless communication node. The one or more beam indices may indicate/specify the beam(s) on which a LBT failure has been triggered. The wireless communication device may use a LBT failure MAC-CE to indicate/specify the one or more beam indices. The LBT failure MAC-CE may provide/specify the one or more beam indices and/or one or more serving cell indices (e.g., $C_7$, $C_6$, $C_5$ and/or other fields corresponding to the serving cell indices). The one or more serving cell indices may specify the serving cell(s) on which a LBT failure has been triggered.

The LBT failure MAC-CE may concatenate/aggregate/combine the serving cell indices and the beam indices into a single MAC-CE. If the highest ServCellIndex of the MAC entity's serving cell is less than 8, the LBT failure MAC-CE may use the format disclosed in FIG. 5. If the highest ServCellIndex of the MAC entity's serving cell is larger than or equal to 8, the LBT failure MAC-CE may use the format disclosed in FIG. 6. The LBT failure MAC-CE may report/indicate the serving cell indices using an octet format. If the highest ServCellIndex of the MAC entity's serving cell is larger than or equal to 8, the LBT failure MAC-CE may use a four octet format. Each of the serving cell indices may correspond to one field of the LBT failure MAC-CE (e.g., $C_0$, $C_1$, $C_2$ and/or other fields). For example, if a consistent LBT failure is triggered (and not cancelled) in a serving cell with a certain serving cell index (e.g., serving cell 0), the value of the corresponding field of the MAC-CE (e.g., $C_0$) may be set to 1 (or other values). Otherwise, the value of the corresponding field (e.g., $C_0$) may be set to 0 (or other values). If the field that corresponds to a certain cell index is set to 1, the LBT failure MAC-CE may include one or more beam indices.

In some embodiments, the LBT failure MAC-CE may use a single octet bitmap when the highest ServCellIndex (or other indices) of the MAC entity's SCell is less than 8. If the highest ServCellIndex of the MAC entity's serving cell is larger than or equal to 8, the LBT failure MAC-CE may use a four octet format.

K. EMBODIMENT 10

Network Configured Detected Beams

In certain spectra (e.g., rel-16 shared spectrum), uplink transmissions may use/implement LBT failure detection/recovery. In some embodiments, a LBT failure number for the uplink transmissions may be compared to a certain threshold. A LBT failure number meeting or exceeding the threshold may trigger a consistent LBT failure. When beam-based LBT is used/enabled/implemented in high frequencies, the LBT status of each beam may differ. Therefore, separate numbers may specify the number of beam-based LBT failures (e.g., LBT failed attempts for each beam).

In some embodiments, the wireless communication node may configure the wireless communication device to report/indicate/count/calculate the total failure count for two (or more) beam directions. In some embodiments, the wireless communication node may group a number of N beam directions into M groups. The wireless communication device may report/count the total failure count for each of the M groups.

In some embodiments, the wireless communication node may send/transmit a subset of a plurality of beams to the wireless communication device. The wireless communication device may monitor/calculate a count of failed LBT attempts for the subset of beams. For example, the wireless communication device may receive/obtain two uplink beams from the wireless communication node. The wireless communication device may monitor the count of failed LBT attempts for the two uplink beams (e.g., the total failure count for the two uplink beams).

For a wireless communication device in a SpCell, a number of failed UL LBT attempts for each beam may meet or exceed a threshold. If the number of failed UL LBT attempts meets or exceeds the threshold, the wireless communication device may switch/change to an UL BWP with RACH resource. In some embodiments, a consistent LBT failure may be triggered in one or more UL BWPs. The UL BWPs may be configured with PRACH occasions on the same carrier in the serving cell. If a consistent LBT failure is triggered, the wireless communication device may indicate/inform the consistent LBT failure to at least one upper layer. For a wireless communication device in a SCell, a number of failed UL LBT attempts for each beam may meet or exceed a threshold. If the number of failed UL LBT attempts meets or exceeds the threshold, a consistent UL LBT failure may be triggered. The wireless communication device may report/inform the consistent UL LBT failure to the wireless communication node using MAC-CE (or other types of signaling). In some embodiments, the wireless communication node may configure one or more SSBs/CSI-RSs to monitor the UL LBT failures at the wireless communication device. The wireless communication node may configure the SSBs/CSI-RSs using a RRC message (or other messages).

L. EMBODIMENT 11

Wireless Communication Device Selection

In certain spectra (e.g., rel-16 shared spectrum), uplink transmissions may use/implement LBT failure detection/ recovery. In some embodiments, a LBT failure number for the uplink transmissions may be compared to a certain threshold. A LBT failure number meeting or exceeding the threshold may trigger a consistent LBT failure. When beam-based LBT is used/enabled/implemented in high frequencies, the LBT status of each beam may differ. Therefore, separate numbers may specify the number of beam-based LBT failures (e.g., LBT failed attempts for each beam).

In some embodiments, the wireless communication device may select/identify/determine a subset of beams (e.g., at least two beams) to monitor uplink interference. The wireless communication device may select a subset of beams to monitor a count of failed LBT attempts for each of the subset of beams. For a wireless communication device in a SpCell, a number of failed UL LBT attempts for each beam may meet or exceed a certain threshold. If the number of failed UL LBT attempts meets or exceeds the threshold, the wireless communication device may switch/change to a UL BWP with RACH resource. In some embodiments, a consistent LBT failure may be triggered in one or more UL BWPs. The UL BWPs may be configured with PRACH occasions on a same carrier in the serving cell. If a consistent LBT failure has been triggered, the wireless communication device may indicate/specify/inform/report the consistent failure to at least one upper layer.

For a wireless communication device in a SCell, a number of failed UL LBT attempts for each beam may meet or exceed a certain threshold. If the number of failed UL LBT attempts meets or exceeds the threshold, a consistent LBT failure may be triggered. The wireless communication device may report the consistent failure to the wireless communication node. The wireless communication device may use MAC-CE signaling (or other types of signaling) to report the consistent failure.

M. Methods for Direction Based Listen Before Talk (LBT)

Figure 7:
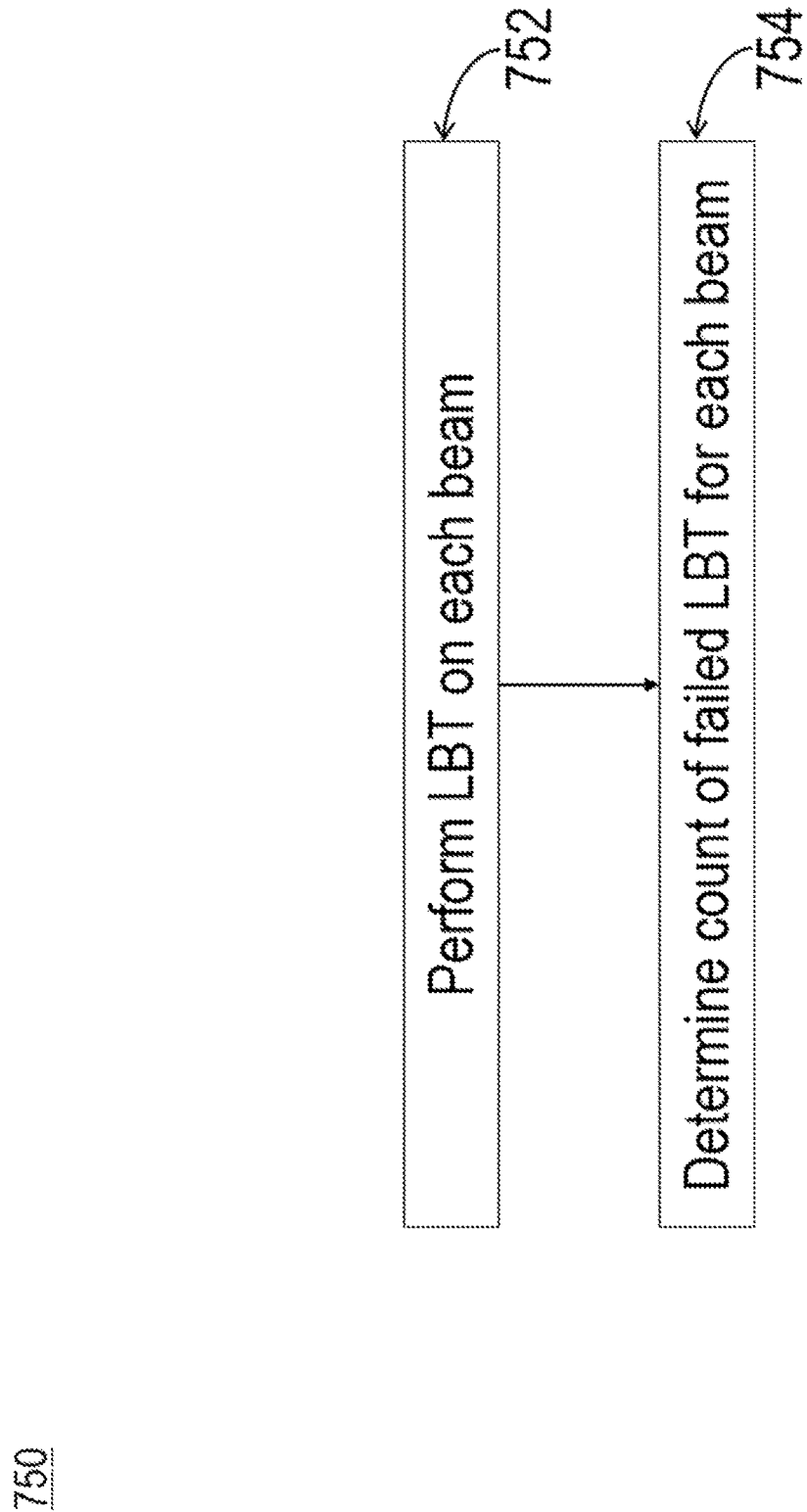
FIG. 7 illustrates a flow diagram of an example method of direction-based LBT, in accordance with an embodiment of the present disclosure.

FIG. 7 illustrates a flow diagram of a method 750 for direction-based listen before talk (LBT). The method 750 may be implemented using any of the components and devices detailed herein in conjunction with FIGS. 1-6. In overview, the method 750 may include performing LBT on each of a plurality of beams (752). The method 750 may include determining a count of failed LBT attempts for at least one of the beams (754).

Referring now to operation (752), and in some embodiments, a wireless communication device may perform LBT on each of a plurality of beams. The wireless communication device may perform/conduct/execute one or more LBT attempts on each of a plurality of beams. Each of the respective beams may have or correspond to at least one beam direction. In some embodiments, the wireless communication device may identify/specify one or more synchronization signal blocks (SSBs) and/or channel state information reference signals (CSI-RSs). Measurements or other aspects (e.g., RSRP, RSSI) of the identified SSBs and/or CSI-RSs may be compared to a first threshold. The identified SSBs and/or CSI-RSs may meet/reach or exceed the first threshold. For each of the plurality of SSBs and/or CSI-RSs, the wireless communication device may identify/specify a physical random access channel (PRACH) resource and/or a preamble (e.g., RACH preamble, PRACH preamble, and/or other transmissions that initiate synchronization/communication with the wireless communication node). The PRACH resource and/or the preamble may correspond/relate to at least one SSB and/or CSI-RS.

Responsive to identifying the PRACH resource and/or the preamble, the wireless communication device may calculate/compute/determine a preamble transmission power and/or a random access radio network temporary identifier (RA-RNTI) for each identified SSB and/or CSI-RS. The MAC layer (or other layers) may indicate/provide/specify the selected PRACH occasion/resource, corresponding RA-RNTI, preamble index, preamble transmission power, and/or other information for each identified SSB and/or CSI-RS to a lower layer. For each of the identified PRACH resources, the wireless communication device may perform/conduct at least one LBT attempt. In some embodiments, at least one of the plurality of beams may correspond to at least one of a number of successful LBT attempts. The wireless communication device may identify the at least one beam to transmit/send/broadcast the corresponding preamble.

Referring now to operation (754), and in some embodiments, the wireless communication device may determine/calculate/compute a count of failed LBT attempts for at least one of the plurality of beams. In some embodiments, a wireless communication node may send/transmit/broadcast downlink control information (DCI) and/or other information to the wireless communication device. The wireless communication device may receive/obtain the DCI comprising an indication of a plurality of SSBs. The DCI may indicate/specify one or more SSBs and/or one or more preamble indices corresponding to each SSB. Responsive to receiving/obtaining the indication, the wireless communication device may perform one or more LBT attempts on the plurality of beams. The plurality of beams may correspond to the plurality of SSBs.

In some embodiments, one or more SSBs and/or CSI-RSs may have a corresponding reference signal received power (RSRP) and/or received signal strength indicator (RSSI). The wireless communication device may determine that each of the one or more SSBs and/or CSI-RSs has a RSRP that meets or exceeds (e.g., equal to and/or higher than) a first threshold. The wireless communication device may determine that each of the one or more SSBs and/or CSI-RSs has a RSSI that is below (e.g., less than and/or equal to) a second threshold. The wireless communication device may configure the first threshold (e.g., rsrp-thresholdSSB) and/or the second threshold (e.g., rssi-thresholdSSB) using system information and/or the RRC message (or other messages). The wireless communication device may select/identify at least one of the one or more SSBs and/or CSI-RS (e.g., with a RSRP greater or equal to the first threshold and/or a RSSI that is below the second threshold). In some embodiments, the wireless communication device may select the at least one SSB and/or CSI-RS in a random/arbitrary manner. The wireless communication device may perform/conduct one or more LBT attempts on the selected SSB(s) and/or CSI-RS (s). Responsive to performing the LBT attempts, the wireless communication device may identify at least one of the plurality of beams corresponding to a successful LBT attempt. The wireless communication device may send/transmit/broadcast a (random access) preamble using the identified beam(s) (e.g., corresponding to a successful LBT attempt).

In some embodiments, the wireless communication device may determine that each of at least one SSBs and/or CSI-RSs has a RSRP that meets or exceeds (e.g., equal to and/or higher than) the first threshold. The wireless communication device may determine that none of the at least one SSBs and/or CSI-RSs has a RSSI that is below (e.g., less than and/or equal to) the second threshold. The wireless communication device may select/identify one or more of the at least one SSBs and/or CSI-RSs. The wireless communication device may perform one or more LBT attempts on the selected SSBs and/or CSI-RS. The wireless communication device may select/identify the one or more of the at least one SSBs and/or CSI-RSs according to RSSI measurements. For example, the wireless communication device may select one or more SSBs/CSI-RSs with a RSSI that exceeds the second threshold by the largest amount. In another example, the wireless communication device may select one or more SSBs/CSI-RSs in a random/arbitrary manner. The RSSI measurements may correspond to the at least one SSBs and/or CSI-RSs. Responsive to performing the LBT attempts, the wireless communication device may identify at least one of the plurality of beams corresponding to a successful LBT attempt. The wireless communication device may send/transmit a preamble using the identified beam(s) (e.g., corresponding to a successful LBT attempt).

In some embodiments, each of at least one SSBs and/or CSI-RSs may have an associated RSSI and/or RSRP. The wireless communication device may determine each of the at least one SSBs and/or CSI-RSs has a RSSI that is below (e.g., less than and/or equal to) the second threshold. The wireless communication device may determine that none of the at least one SSBs and/or CSI-RSs have a RSRP that meets or exceeds the first threshold. The wireless communication device may select/identify one or more of the at least one SSBs and/or CSI-RSs. In some embodiments, the one or more SSBs and/or CSI-RSs may be selected according to a wireless communication device implementation and/or according to one or more rules or configurations. For example, the wireless communication device may select one or more SSBs and/or CSI-RSs with a RSRP that is nearest/closest to the first threshold. The wireless communication device may perform one or more LBT attempts on the selected SSBs and/or CSI-RSs. Responsive to performing the LBT attempts, the wireless communication device may identify at least one of the plurality of beams corresponding to a successful LBT attempt. The wireless communication device may send/transmit a preamble (e.g., a random access preamble or other transmission) using the identified beam(s).

In some embodiments, the wireless communication device may determine that none of at least one SSBs and/or CSI-RSs have a RSRP that meets or exceeds the first threshold. In some embodiments, the wireless communication device may determine that none of at least one SSBs and/or CSI-RSs have a RSSI that is below the second threshold. The wireless communication device may select/identify one or more of the at least one SSBs and/or CSI-RSs. In some embodiments, the one or more SSBs and/or CSI-RSs may be selected according to a wireless communication device implementation. For example, the wireless communication device may select at least one SSB and/or CSI-RS with a RSRP that is nearest/closest to the first threshold. In another example, the wireless communication device may select one or more SSBs/CSI-RSs in a random/arbitrary manner. The wireless communication device may perform one or more LBT attempts on the selected SSBs and/or CSI-RSs. Responsive to performing the LBT attempts, the wireless communication device may identify at least one of the plurality of beams corresponding to a successful LBT attempt. The wireless communication device may send/transmit a preamble using the identified beam(s). Responsive to performing the preamble transmission(s), the wireless communication device may stop/suspend other ongoing LBT attempts.

In some embodiments, the wireless communication device may select/identify one or more of the at least one SSBs and/or CSI-RSs. The wireless communication device may perform/conduct one or more LBT attempts on the selected SSBs and/or CSI-RSs. The wireless communication device may select the SSBs and/or CSI-RSs according to a pre-configured implementation of the wireless communication device. The wireless communication device may select the SSBs and/or CSI-RSs according to the RSRPs of the selected SSBs and/or CSI-RSs. The wireless communication device may select the SSBs and/or CSI-RSs having RSRPs that are closest to the first threshold. The selected SSBs and/or CSI-RSs with RSRPs closest to the first threshold may be among those of the at least one SSBs and/or CSI-RSs. The wireless communication device may select the SSBs and/or CSI-RSs having RSRPs that meet the first threshold or exceed the first threshold by greatest extents. The selected SSBs and/or CSI-RSs with RSRPs that exceed the first threshold by greatest extents may be among those of the at least one SSBs and/or CSI-RSs.

The wireless communication device may select the SSBs and/or CSI-RSs according to the RSSIs of the selected SSBs and/or CSI-RSs. The wireless communication device may select the SSBs and/or CSI-RSs having RSSIs that are closest to the second threshold. The selected SSBs and/or CSI-RSs with RSSIs closest to the second threshold may be among those of the at least one SSBs or CSI-RSs. The wireless communication device may select the SSBs and/or CSI-RSs having RSSIs that exceed the second threshold by greatest extents. The selected SSBs and/or CSI-RSs with RSSIs that exceed the second threshold by greatest extents may be among those of the at least one SSBs and/or CSI-RSs. The wireless communication device may select the SSBs and/or CSI-RSs according to a random/arbitrary selection process.

In some embodiments, each of at least one SSBs and/or CSI-RSs may have/correspond to at least one RSRP. The RSRP(s) may be compared to a first threshold. The wireless communication device may determine that the RSRP(s) of each of at least one SSBs and/or CSI-RSs meets or exceeds the first threshold. In some embodiments, the wireless communication device may determine/calculate a count of failed LBT attempts (e.g., LBT failure statistics) for each of the at least one SSBs or CSI-RSs. The wireless communication device may use the count of failed LBT attempts to select/identify/determine one or more of the at least one SSBs and/or CSI-RSs. For example, the wireless communication device may select/identify one or more SSBs and/or CSI-RSs with a low load (e.g., SSBs/CSI-RSs with a low count of failed LBT attempts). The wireless communication device may perform/conduct one or more LBT attempts on the selected SSBs and/or CSI-RSs.

In some embodiments, the wireless communication device may determine/calculate/compute/track a count of failed LBT attempts (e.g., LBT failure statistics) for one or more SSBs. Each of the one or more SSBs may correspond to a respective one of the plurality of beams. Responsive to determining the count, the wireless communication device may select/identify a first beam of the plurality of beams. The wireless communication device may use the count(s) of failed LBT attempts to select the first beam of the plurality of beams. For example, the wireless communication device may count/calculate/use the number of failed LBT attempts per beam to select/identify/determine/use a beam with a light load (e.g., a beam with a low count of failed LBT attempts).

In some embodiments, a count of failed LBT attempts may comprise a maximum value of a counter prior to a timer expiring or restarting. The count of failed LBT attempts may enumerate/indicate/specify the number of failed LBT attempts for a first SSB corresponding to a first beam.

Responsive to the occurrence of a failed LBT attempt, the counter may increment/increase in value (e.g., by a value of 1 or other defined value). Responsive to the occurrence of a failed LBT attempt, the timer may start or restart. Once the timer runs its full course/duration (e.g., the timer expires), the counter may change/set/reset to a value to 0 (or other defined value). The timer may run its full course/duration (e.g., until expiration) unless another failed LBT attempt occurs. In some embodiments, the counter may increment in value responsive to a failed LBT attempt. If the counter has a value of 0, the timer may start or restart responsive to a failed LBT attempt. Therefore, unless the counter has a value of 0, the timer may run its full course/duration prior to restarting.

In some embodiments, the wireless communication device may receive/obtain an indication of the plurality of beams from a wireless communication node. The wireless communication node may send/transmit/broadcast the indication via radio resource control (RRC) signaling (or other types of signaling). For a transmission using a configured grant, the wireless communication device may perform one or more LBT attempts. The wireless communication device may perform the one or more LBT attempts on each of the plurality of beams. The wireless communication device may use the configured grant to select/identify a first beam from the plurality of beams for the transmission. In some embodiments, the wireless communication device may determine a successful LBT attempt occurred. The successful LBT attempt may occur on the first beam of the plurality of beams. The wireless communication device may determine the successful LBT attempt occurred prior to any other successful LBT attempt. In some embodiments, the first beam of the plurality of beams may have a count of failed LBT attempts. The wireless communication device may determine that the count of failed LBT attempts is lower/less than those of others of the plurality of beams. For example, the wireless communication device may select at least one beam with a load that is lighter/less/lower than the loads of other beams. The wireless communication device may use the count of failed LBT attempts to determine the load of each beam.

In some embodiments, the wireless communication device may receive/obtain an indication of the plurality of beams from the wireless communication node. The wireless communication node may send/transmit the indication via medium access control control element (MAC-CE) signaling (or other types of signaling). The wireless communication device may use an uplink control channel resource (e.g., PUCCH) to perform one or more LBT attempts. The wireless communication device may perform the one or more LBT attempts on each of the plurality of beams. The wireless communication device may use the uplink control channel resource to select/identify a first beam from the plurality of beams for the transmission. In some embodiments, the wireless communication device may determine a successful LBT attempt occurred. The successful LBT attempt may occur on the first beam of the plurality of beams. The wireless communication device may determine the successful LBT attempt occurred prior to any other successful LBT attempt. In some embodiments, the first beam of the plurality of beams may have a count of failed LBT attempts. The wireless communication device may determine the count of failed LBT attempts is lower/less than those of others of the plurality of beams. For example, the wireless communication device may select at least one beam with a load that is lighter/less/lower than the loads of other beams. The wireless communication device may use the count of failed LBT attempts to determine the load of each beam.

In some embodiments, the wireless communication device may determine a count of failed LBT attempts (e.g., DL LBT statistics) for each of a plurality of beams. A count of failed LBT attempts for a first beam may comprise a maximum value of a counter prior to a timer expiring or restarting. Responsive to a failed LBT attempt, the counter may increment/increase in value (e.g., by a value of 1). Responsive to a failed LBT attempt, the timer may start or restart. Once the timer runs its full course/duration (e.g., the timer expires), the counter may change/set to a value of 0. Therefore, the timer may run its full course until expiration unless a failed LBT attempt occurs. If the counter has a value of 0, the timer may start or restart responsive to a failed LBT attempt. If the counter has a value of 0, the counter may increment/increase in value (e.g., by a value of 1) responsive to a failed LBT attempt.

In some embodiments, the value of the counter may meet or exceed a threshold prior to a timer expiration and/or restart. If the counter's value reaches the threshold, the timer may stop/suspend its course. If the counter's value reaches the threshold, the counter may change/set/reset to value of 0 (or other defined value). If the counter's value fails to reach the threshold, the counter may change to a value of 0 (or other defined value). Responsive to a failed LBT attempt, the counter may increment/increase in value (e.g., by a value of 1 or other defined value). Responsive to a successful LBT attempt, the value of the counter may change to 0 for instance.

In some embodiments, the value of the counter may meet or exceed the threshold. If the counter's value reaches the threshold, beam failure recovery may be triggered/initiated/caused for a wireless communication device in a SpCell. If the counter's value reaches the threshold, the wireless communication device may switch/change from a first BWP to a second BWP. The wireless communication device may perform a random access procedure in the second BWP. If the counter's value reaches the threshold, a consistent LBT failure may be reported/informed to an upper layer for the wireless communication device in the SpCell. The consistent LBT failure may be reported when the counter's value meets or exceeds the threshold in a current active BWP. If the counter's value reaches the threshold, beam failure recovery may be triggered/initiated/caused for a wireless communication device in a SCell. If the counter's value reaches the threshold, a consistent LBT failure may be reported/informed to the wireless communication node for the wireless communication device in the SCell. The consistent LBT failure may be reported via MAC-CE signaling (or other types of signaling). If the counter's value reaches the threshold, the wireless communication device may switch/change from a first BWP to a second BWP. The wireless communication device may perform a random access procedure in the second BWP.

In some embodiments, the wireless communication device in a SCell may evaluate/analyze the RSRP and/or RSSI of a first SSB and/or CSI-RS. The wireless communication device may determine that the RSRP of the first SSB and/or CSI-RS meets or exceeds a first threshold. The wireless communication device may determine that the RSSI of the first SSB and/or CSI-RS is below a second threshold. The first and/or second thresholds may be specified/configured via RRC signaling (or other types of signaling). Responsive to the determination, the wireless communication device may report/specify/indicate an identification of the first SSB and/or CSI-RS to the wireless communication node. For example, the wireless communication device may report an index of a SSB (or CSI-RS) with an RSRP and/or RSSI that meet or exceed their respective thresholds (e.g., the first and/or second threshold).

In some embodiments, the wireless communication device in a SpCell may send/transmit/broadcast one or more indices to the wireless communication node. The wireless communication device may transmit the one or more indices via MAC-CE signaling (or other types of signaling). The wireless communication device may use a novel format of the MAC-CE (e.g., LBT failure MAC-CE format) to transmit/send the one or more indices. The one or more indices may indicate/specify/provide the one or more of the plurality of beams on which a consistent LBT failure has occurred.

In some embodiments, the wireless communication device may receive/obtain a subset of the plurality of beams (e.g., at least two beams) from the wireless communication node. The wireless communication device may monitor/analyze the received subset of beams. The wireless communication device may monitor/determine/analyze a count of failed LBT attempts for the subset of the plurality of beams. For example, the wireless communication device may monitor the total count of failed attempts (e.g., the combined number of individual failed attempts for each beam of the subset) for the subset of the plurality of beams. In some embodiments, the wireless communication device may determine a subset of the plurality of beams to monitor. The wireless communication device may monitor a count of failed LBT attempts for each of the subset of the plurality of beams. For example, the wireless communication device may monitor the individual count of failed LBT attempts for each beam included in the subset.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

The invention claimed is:

1. A method comprising:
   determining, by a wireless communication device, a subset of a plurality of beams to monitor, the subset being less than the plurality of beams;
   performing, by the wireless communication device, one or more listen-before-talk (LBT) attempts on each of the plurality of beams, each of the plurality of beams having a respective beam direction; and
   determining, by the wireless communication device, a count of failed LBT attempts for the subset of the plurality of beams.

2. The method of claim 1, comprising:
   identifying, by the wireless communication device, a plurality of synchronization signal blocks (SSBs) or channel state information reference signals (CSI-RSs) meeting a first threshold;
   identifying, by the wireless communication device for each of the plurality of SSBs or CSI-RSs, a physical random access channel (PRACH) resource and a preamble corresponding to the SSB or CSI-RS;
   performing, by the wireless communication device for each of the identified PRACH resources, at least one LBT attempt; and
   identifying, by the wireless communication device, one of the plurality of beams corresponding to one of a number of successful LBT attempts, to transmit a corresponding preamble.

3. The method of claim 1, comprising:
   receiving, by the wireless communication device from a wireless communication node, downlink control information (DCI) comprising an indication of a plurality of synchronization signal blocks (SSBs); and
   performing, by the wireless communication device responsive to the indication of the plurality of SSBs, the one or more LBT attempts on the plurality of beams corresponding to the plurality of SSBs.

4. The method of claim 1, comprising:
   determining, by the wireless communication device, that each of at least one synchronization signal blocks (SSBs) or channel state information reference signals (CSI-RSs) has a reference signal received power (RSRP) that is above a first threshold, and a received signal strength indicator (RSSI) that is below a second threshold;
   selecting, by the wireless communication device, one or more of the at least one SSBs or CSI-RSs to perform the one or more LBT attempts; and
   identifying, by the wireless communication device, one of the plurality of beams corresponding to a successful LBT attempt, to transmit a preamble.

5. The method of claim 1, comprising:
   determining, by the wireless communication device, that each of at least one synchronization signal blocks (SSBs) or channel state information reference signals (CSI-RSs) has a reference signal received power (RSRP) that is above a first threshold, and none of the at least one SSBs or CSI-RSs have a received signal strength indicator (RSSI) that is below a second threshold;
   selecting, by the wireless communication device, one or more of the at least one SSBs or CSI-RSs to perform the one or more LBT attempts, according to RSSI measurements of the at least one SSBs or CSI-RSs; and
   identifying, by the wireless communication device, one of the plurality of beams corresponding to a successful LBT attempt, to transmit a preamble.

6. The method of claim 1, comprising:
   determining, by the wireless communication device, that each of at least one synchronization signal blocks (SSBs) or channel state information reference signals (CSI-RSs) has a received signal strength indicator (RSSI) that is below a second threshold, and none of the at least one SSBs or CSI-RSs have a reference signal received power (RSRP) that is above a first threshold;
   selecting, by the wireless communication device, one or more of the at least one SSBs or CSI-RSs to perform the one or more LBT attempts; and
   identifying, by the wireless communication device, one of the plurality of beams corresponding to a successful LBT attempt, to transmit a preamble.

7. The method of claim 1, comprising:
   determining, by the wireless communication device, that none of at least one synchronization signal blocks (SSBs) or channel state information reference signals (CSI-RSs) have a reference signal received power (RSRP) that is above a first threshold, and a received signal strength indicator (RSSI) that is below a second threshold;
   selecting, by the wireless communication device, one or more of the at least one SSBs or CSI-RSs to perform the one or more LBT attempts; and
   identifying, by the wireless communication device, one of the plurality of beams corresponding to a successful LBT attempt, to transmit a preamble.

8. The method of claim 4, comprising:
   selecting, by the wireless communication device, one or more of the at least one SSBs or CSI-RSs to perform the one or more LBT attempts, according to at least one of:
   a pre-configured implementation of the wireless communication device,
   the one or more of the at least one SSBs or CSI-RSs having RSRPs that are closest to the first threshold among those of the at least one SSBs or CSI-RSs,
   the one or more of the at least one SSBs or CSI-RSs having RSSIs that are closest to the second threshold among those of the at least one SSBs or CSI-RSs, the one or more of the at least one SSBs or CSI-RSs having RSRPs that exceed the first threshold by greatest extents among those of the at least one SSBs or CSI-RSs, the one or more of the at least one SSBs or CSI-RSs having RSSIs that exceed the second threshold by greatest extents among those of the at least one SSBs or CSI-RSs, or a random selection process.

9. The method of claim 1, comprising:
determining, by the wireless communication device, that each of at least one synchronization signal blocks (SSBs) or channel state information reference signals (CSI-RSs) has a reference signal received power (RSRP) that is above a first threshold;
determining, by the wireless communication device, a count of failed LBT attempts for each of the at least one SSBs or CSI-RSs; and
selecting, by the wireless communication device, one or more of the at least one SSBs or CSI-RSs to perform the one or more LBT attempts, according to the counts of failed LBT attempts.

10. The method of claim 1, comprising:
determining, by the wireless communication device, a count of failed LBT attempts for each synchronization signal block (SSB) corresponding to a respective one of the plurality of beams; and
selecting, by the wireless communication device, a first beam of the plurality of beams, according to the counts of failed LBT attempts.

11. The method of claim 10, wherein a count of failed LBT attempts for a first SSB corresponding to a first beam comprises a maximum value of a counter prior to a timer expiring or restarting, wherein:
the counter increments in value and the timer starts or restarts responsive to a failed LBT attempt, the counter set to 0 when the timer expires, or
the counter increments in value responsive to a failed LBT attempt, the timer starts or restarts responsive to a failed LBT attempt when the counter's value is 0.

12. The method of claim 1, comprising:
receiving, by the wireless communication device from a wireless communication node, an indication of the plurality of beams via radio resource control (RRC) signaling;
performing, by the wireless communication device for a transmission using a configured grant, the one or more LBT attempts on each of the plurality of beams; and
selecting a first beam from the plurality of beams for the transmission using the configured grant, comprising:
determining, by the wireless communication device, that a successful LBT attempt occurred on the first beam of the plurality of beams, prior to any other successful LBT attempt;
or
determining, by the wireless communication device, that the first beam of the plurality of beams has a count of failed LBT attempts that is lower than those of others of the plurality of beams.

13. The method of claim 1, comprising:
receiving, by the wireless communication device from a wireless communication node, an indication of the plurality of beams via medium access control control element (MAC-CE) signaling;

performing, by the wireless communication device for a transmission using an uplink control channel resource, the one or more LBT attempts on each of the plurality of beams; and
selecting a first beam from the plurality of beams for the transmission using the uplink control channel resource, comprising:
determining, by the wireless communication device, that a successful LBT attempt occurred on the first beam of the plurality of beams, prior to any other successful LBT attempt;
or
determining, by the wireless communication device, that the first beam of the plurality of beams has a count of failed LBT attempts that is lower than those of others of the plurality of beams.

14. The method of claim 1, comprising:
determining, by the wireless communication device, a count of failed LBT attempts for each of the plurality of beams, wherein the count of failed LBT attempts for a first beam comprises a maximum value of a counter prior to a timer expiring or restarting, wherein:
the counter increments in value and the timer starts or restarts responsive to a failed LBT attempt, the counter set to 0 when the timer expires,
or
responsive to a failed LBT attempt when the counter's value is 0, the timer starts or restarts and the counter increments in value, wherein:
when the counter's value reaches a threshold prior to the timer expiring or restarting, the timer stops and the counter is set to 0, and
when the timer expires and the counter's value fails to reach the threshold, the counter is set to 0;
or
the counter increments in value responsive to a failed LBT attempt, and the counter's value is set to 0 responsive to a successful LBT attempt.

15. The method of claim 14, wherein when the counter's value reaches the threshold,
for a wireless communication device in a primary cell of a master or secondary cell group (SpCell):
triggering beam failure recovery,
switching, by the wireless communication device, from a first bandwidth part (BWP) to a second BWP in which to perform a random access procedure, or
reporting a consistent LBT failure to an upper layer, when the counter's value reaches the threshold in a current active BWP; or
for a wireless communication device in a secondary cell (SCell):
triggering beam failure recovery,
reporting a consistent LBT failure to a wireless communication node via medium access control control element (MAC-CE) signaling, or
switching, by the wireless communication device, from a first bandwidth part (BWP) to a second BWP in which to perform a random access procedure.

16. The method of claim 1, comprising:
determining, by the wireless communication device in a secondary cell (SCell), that a first synchronization signal block (SSB) or channel state information reference signal (CSI-RS) has a reference signal received power (RSRP) that is above a first threshold, and a received signal strength indicator (RSSI) that is below a second threshold; and reporting, by the wireless communication device to a wireless communication node, an identification of the first SSB or CSI-RS.

17. The method of claim 1, comprising:
transmitting, by the wireless communication device in a primary cell of a master or secondary cell group (SpCell), to a wireless communication node via medium access control control element (MAC-CE) signaling, one or more indices indicative of one or more of the plurality of beams on which a consistent LBT failure has occurred.

18. The method of claim 1, wherein determining the subset of the plurality of beams to monitor comprises:
receiving, by the wireless communication device from a wireless communication node, the subset of the plurality of beams to monitor.

19. A wireless communication device, comprising:
at least one processor configured to:
determine a subset of a plurality of beams to monitor, the subset being less than the plurality of beams;
perform one or more listen-before-talk (LBT) attempts on each of the plurality of beams, each of the plurality of beams having a respective beam direction; and
determine a count of failed LBT attempts for the subset of the plurality of beams.

20. The wireless communication device of claim 19, wherein, to determine the subset of the plurality of beams to monitor, the at least one processor is configured to receive, from a wireless communication node, the subset of the plurality of beams to monitor.

* * * * *